US012614175B2

(12) United States Patent　(10) Patent No.: US 12,614,175 B2
Patel et al.　(45) Date of Patent:　Apr. 28, 2026

(54) METHOD APPARATUS AND COMPUTER PROGRAM PRODUCT FOR CONSTRUCTING A SET OF MOTIFS FOR USE IN DETECTING MESSAGES OF INTEREST

(71) Applicant: VOCALINK INTERNATIONAL LIMITED, London (GB)

(72) Inventors: Prina Rajendra Kumar Patel, Coulsdon (GB); Michael Alan Dewer, Richmond (GB)

(73) Assignee: VOCALINK INTERNATIONAL LIMITED, London (GB)

( * ) Notice: Subject to any disclaimer, the term of this patent is extended or adjusted under 35 U.S.C. 154(b) by 0 days.

(21) Appl. No.: 18/682,926

(22) PCT Filed: Aug. 2, 2022

(86) PCT No.: PCT/EP2022/071626
§ 371 (c)(1),
(2) Date: Feb. 11, 2024

(87) PCT Pub. No.: WO2023/016853
PCT Pub. Date: Feb. 16, 2023

(65) Prior Publication Data
US 2024/0346496 A1　Oct. 17, 2024

(30) Foreign Application Priority Data
Aug. 11, 2021　(GB) ...................................... 2111510

(51) Int. Cl.
*G06Q 20/38*　(2012.01)
*G06Q 40/02*　(2023.01)

(52) U.S. Cl.
CPC ........... *G06Q 20/389* (2013.01); *G06Q 40/02* (2013.01); *G06Q 40/022* (2025.08); *G06Q 40/0222* (2025.08); *G06Q 40/026* (2025.08)

(58) Field of Classification Search
CPC ...................................................... G06Q 20/389
See application file for complete search history.

(56) References Cited

U.S. PATENT DOCUMENTS

2008/0154964 A1 * 6/2008 Matsuyama ............. G16B 5/00
2012/0240185 A1 * 9/2012 Kapoor ............... H04L 41/0866
726/1

(Continued)

FOREIGN PATENT DOCUMENTS

EP　1630723 A2 * 3/2006　......... G06K 9/00402
EP　3582437　12/2019
EP　3761253　1/2021

OTHER PUBLICATIONS

Gottar, Chantal, "International Search Report & Written Opinion", International Application No. PCT/EP2022/0711626, mailed Nov. 14, 2022, 15 pages.

(Continued)

*Primary Examiner* — Scott C Anderson
(74) *Attorney, Agent, or Firm* — Barta Jones, PLLC

(57) ABSTRACT

A method of constructing a set of motifs for use in detecting messages of interest in a network of nodes is provided, the method comprising controlling circuitry to: acquire target data, the target data comprising a set of messages which have been exchanged between nodes in the network, the set of messages including a number of messages of interest; acquire control data, the control data comprising a set of messages which have been produced based on a random exchange of messages between nodes in the network; detect motifs within the target data and the control data, each motif being a repeated pattern of messages appearing within either (Continued)

the target data and/or the control data; generate a set of values indicative of a significance of the motifs which have been detected in the target data and the motifs which have been detected in the control data using a frequency with which these motifs have been detected; and construct a set of motifs for use in detecting messages of interest in the network using the set of values which have been produced and a comparison of the motifs detected in the target data with the motifs detected in the control data.

20 Claims, 12 Drawing Sheets

(56) References Cited

U.S. PATENT DOCUMENTS

| | | | | |
|---|---|---|---|---|
| 2019/0095425 | A1* | 3/2019 | Galitsky | G06F 40/295 |
| 2019/0188218 | A1* | 6/2019 | Harris | G06F 16/3347 |
| 2020/0012900 | A1 | 1/2020 | Walters et al. | |
| 2020/0118028 | A1* | 4/2020 | Harris | H04L 63/1416 |
| 2020/0167787 | A1 | 5/2020 | Kursun | |
| 2020/0366698 | A1 | 11/2020 | Sampiao et al. | |
| 2021/0103580 | A1 | 4/2021 | Schierz et al. | |

OTHER PUBLICATIONS

Fontes et al., "Finding NeMo: Fishing in Banking Networks Using Network Motifs", ARXIV.org, Cornell University Library, Aug. 10, 2021, 6 pages.

Erdos et al., "On Random Graphs I.", copyright 1959, 8 pages.

Ribeiro et al., "G-Tries: an efficient data structure for discovering network motifs", ACM SAC'Mar. 22-26, 10, 2010, Sierre, Switzerland, copyright 2010, 10 pages.

Selvan et al., "Motifs and Community Detection in the Venmo Transaction Graph", Stanford University, Dec. 11, 2019, 8 pages.

Milo et al., "Network Motifs: Simple Building Blocks of Complex Networks", Science, vol. 298, No. 5594, Oct. 25, 2002, 4 pages.

Hou, Jie, "Extended European Search Report", European Patent Application No. 22161388.8, mailed Aug. 19, 2022, 9 pages.

* cited by examiner

METHOD APPARATUS AND COMPUTER PROGRAM PRODUCT FOR CONSTRUCTING A SET OF MOTIFS FOR USE IN DETECTING MESSAGES OF INTEREST

BACKGROUND

Field of Disclosure

The present invention relates to a method, apparatus and computer program product for constructing a set of motifs for use in detecting messages of interest and a method, apparatus and computer program product for using the set of motifs in the detection of messages of interest.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

Modern computer networks and modern computer systems are very complex. Indeed, these networks and systems may be very large and include a significant number of interconnected devices. These interconnected devices often send a large number of electronic messages across the network. Such messages may include information regarding the status of the individual devices. Furthermore, these electronic messages may be used in order to transfer certain electronic goods across the network. Banking systems are an example of these modern computer networks and systems. In a banking network a number of different bank accounts are connected as individual nodes of the network. Electronic messages can be transferred between the bank accounts in order to transfer funds across the network.

However, banking fraud and scamming is an increasing problem. In a typical fraud or scam, a perpetrator of the fraud will illegally obtain funds from a victim's bank account. This may be via a "phishing" or "malware" attack, where access to the victim's banking accounts or facilities is obtained. For example, a perpetrator of a fraud or scam may access a victim's account or deceptively obtain funds via means of the victim transferring the funds into the perpetrator's bank account.

After the funds have been transferred from the victim's account, the perpetrator will transfer funds through numerous other bank accounts. These other bank accounts may, for example, be legitimate bank accounts which have also been compromised, bank accounts set up using illegally obtained documents (such as a stolen or fake passport), or bank accounts rented from a third party to be used for illicit purposes.

The speed at which the funds are transferred between these accounts following banking fraud is usually very high. Typically, a transfer between multiple bank accounts across the network may be completed within a few minutes.

The rapid transfer of funds occurs for two reasons. The first reason is to make tracing of funds more difficult. That is, since investigation into banking fraud is often done manually using a limited data view from each bank, it can be difficult to trace the movement of funds originating from an initial fraudulent transaction across the banking network. The second reason is to disperse the money from the initial fraudulent transaction. This allows a perpetrator to use the money more easily without arousing suspicion (such as by withdrawing small amounts of money as cash from an Automated Teller Machine (ATM)).

Published patent applications EP3629273A1 and EP362955A1 describe methods which can build a set of messages through a network. The contents of EP3629273A1 and EP362955A1 are incorporated by reference. Specifically, in the present disclosure, the contents of EP3629273A1 and EP362955A1 relating to building the set of messages are incorporated by reference. These methods can be used in order to trace the dispersion of funds across a network. That is, related and/or connected messages in the network are identified and established as a unique set of messages within the network.

These sets of messages can become very large and complex. In an economy such as that of the United Kingdom, the number of transactions occurring between accounts could reach a rate of around 300 transactions per second—or even more than this. Owing to the number of transactions and complexity of the banking network, the trail of the dispersion of funds from an initial fraudulent transaction can become very complex in a very short period of time. Moreover, owing to the number of transactions and complexity of the banking network, it can be very computationally demanding to distinguish between messages (or sets of messages) related to legitimate transfer of funds across a banking network and messages (or sets of messages) which are related to fraudulent activity in the network.

It is an aim of the present disclosure to address these issues.

SUMMARY

In a first aspect of the present disclosure, a method of constructing a set of motifs for use in detecting messages of interest in a network of nodes is provided, the method comprising controlling circuitry to: acquire target data, the target data comprising a set of messages which have been exchanged between nodes in the network, the set of messages including a number of messages of interest: acquire control data, the control data comprising a set of messages which have been produced based on a random exchange of messages between nodes in the network; detect motifs within the target data and the control data, each motif being a repeated pattern of messages appearing within either the target data and/or the control data: generate a set of values indicative of a significance of the motifs which have been detected in the target data and the motifs which have been detected in the control data using a frequency with which these motifs have been detected; and construct a set of motifs for use in detecting messages of interest in the network using the set of values which have been produced and a comparison of the motifs detected in the target data with the motifs detected in the control data.

In a second aspect of the present disclosure, a method of using a set of motifs in detection of messages of interest in a network of nodes is provided, the method comprising controlling circuitry to: acquire a set of motifs for use in detecting messages of interest in the network of nodes, the set of motifs being constructed in accordance with a method of the present disclosure: acquire second data, the second data comprising a set of messages which have been exchanged between nodes in the network: detect motifs within the second data, each motif being a repeated pattern of messages appearing within the second data; and identify messages of interest by comparing the set of motifs with the detected motifs within the second data.

In a third aspect of the present disclosure, apparatus for constructing a set of motifs for use in detecting messages of interest in a network of nodes is provided, the apparatus comprising circuitry configured to: acquire target data, the target data comprising a set of messages which have been exchanged between nodes in the network, the set of messages including a number of messages of interest: acquire control data, the control data comprising a set of messages which have been produced based on a random exchange of messages between nodes in the network: detect motifs within the target data and the control data, each motif being a repeated pattern of messages appearing within either the target data and/or the control data: generate a set of values indicative of a significance of the motifs which have been detected in the target data and the motifs which have been detected in the control data using a frequency with which these motifs have been detected; and construct a set of motifs for use in detecting messages of interest in the network using the set of values which have been produced and a comparison of the motifs detected in the target data with the motifs detected in the control data.

In a fourth aspect of the present disclosure, apparatus for using a set of motifs in detection of messages of interest in a network of nodes is provided, the apparatus comprising circuitry configured to: acquire a set of motifs for use in detecting messages of interest in the network of nodes, the set of motifs being constructed in accordance with a method of the present disclosure: acquire second data, the second data comprising a set of messages which have been exchanged between nodes in the network: detect motifs within the second data, each motif being a repeated pattern of messages appearing within the second data; and identify messages of interest by comparing the set of motifs with the detected motifs within the second data.

In a fifth aspect of the present disclosure, a computer program product comprising instructions which, when implemented by a computer, causes the computer to perform a method of the present disclosure is provided.

According to embodiments of the disclosure, a set of motifs (or patterns of messages or transactions between nodes in a network) which can be used in order to identify certain activity of interest in a network can be efficiently and reliably established. These motifs can be used in order to identify the activity of interest with increased speed and computational efficiency. In a banking network, for example, this enables fraudulent activity to be rapidly and efficiently identified. Accordingly, the fraudulent activity can be disrupted more effectively.

Of course, it will be appreciated that the present disclosure is not limited to the above identified technical effects. Rather, other technical effects will be apparent to the skilled person when reading the disclosure.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
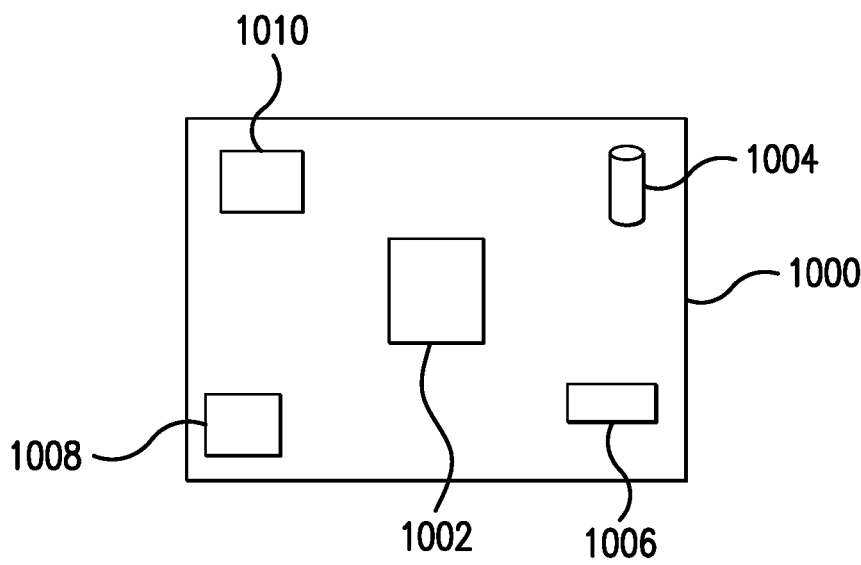
FIG. 1 illustrates an example apparatus in accordance with embodiments of the disclosure.

Referring now to the drawings, wherein like reference numerals designate identical or corresponding parts throughout the several views.

FIG. 1 illustrates an example apparatus in accordance with embodiments of the disclosure. Typically, an apparatus 1000 according to embodiments of the disclosure is a computer device such as a personal computer or a terminal connected to a server. Indeed, in embodiments, the apparatus may also be a server. The apparatus 1000 is controlled using a microprocessor or other processing circuitry 1002. More generally, the apparatus 1000 is a data processing apparatus.

The processing circuitry 1002 may be a microprocessor carrying out computer instructions or may be an Application Specific Integrated Circuit. The computer instructions are stored on storage medium 1004 which may be a magnetically readable medium, optically readable medium or solid state type circuitry. The storage medium 1004 may be integrated into the apparatus 1000 or may be separate to the apparatus 1000 and connected thereto using either a wired or wireless connection. The computer instructions may be embodied as computer software that contains computer readable code which, when loaded onto the processor circuitry 1002, configures the processor circuitry 1002 to perform a method according to embodiments of the disclosure.

Additionally connected to the processor circuitry 1002, is a user input unit 1008. The user input unit 1008 may be a touch screen or may be a mouse or stylus type input device. The user input 1008 may also be a keyboard or any combination of these devices. Furthermore, in some examples, the user input unit 1008 may also be a voice input device (such as a microphone device or the like) which is configured to receive sounds (such as a spoken command or the like) as input from a user. Indeed, any form of input device may be used insofar as that device enables a user to provide instruction or other forms of input to the apparatus 1000.

Communication circuitry 1010 is also coupled to the processing circuitry 1002. The communication circuitry 1010 may provide a connection to a Local Area Network or a Wide Area Network such as the Internet or a Virtual Private Network or the like. For example, the communication circuitry 1010 may be connected to infrastructure allowing the processor circuitry 1002 to communicate with other devices or infrastructure equipment in order to obtain or provide relevant data. For example, the communication circuitry 1010 may enable the apparatus 1000 to communicate with financial institutions in a banking network or the like. The communication circuitry 1010 may therefore be behind a firewall or some other form of network security. This improves security of the apparatus 1000 and the data which is processed by that apparatus.

Additionally coupled to the processing circuitry 1002, is a display device 1006. The display device, although shown integrated into the apparatus 1000, may be separate to the apparatus 1000 and may be an electronic display (e.g. liquid crystal display (LCD) or the like) or some kind of device allowing the user to visualise the operation of the system. In addition, the display device 1006 may be a printer or some other device allowing relevant information generated by the apparatus 1000 to be viewed by the user or by a third party.

Figure 2:
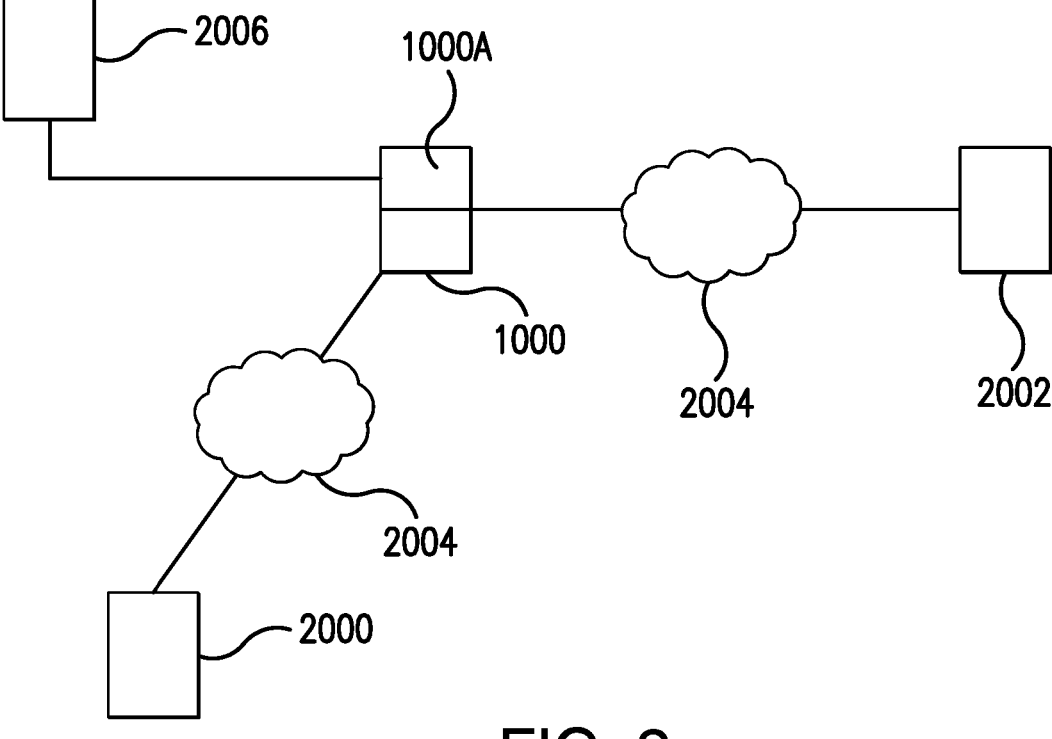
FIG. 2 illustrates an example network to which embodiments of the disclosure may be applied.

Referring now to FIG. 2, example network to which embodiments of the present disclosure may be applied is illustrated.

In this example illustrated in FIG. 2, a server 1000A is located in a network. The network may be a banking network, for example (however, the present disclosure is not particularly limited in this regard-embodiments may be applied to other networks). Additionally, a first device 2000 may be connected to server 1000A over a communication interface 2004 (such as the internet or secure communication or the like). A second device 2002 may also be connected to the server 1000A over a communication interface 2004. This enables the server 1000A to exchange information with each of the first device 2000 and the second device 2002 respectively.

In this example, each of the first and the second device may be a financial institution such as a banking institution or the like. Moreover, each of the first and second device has a number of associated accounts (e.g. bank accounts) which can be used in order to exchange messages with other accounts over the banking network. Accordingly, the accounts which are associated with/held by each of the first and second device form nodes on the banking network. Indeed, in this example, each account may itself be associated with a certain value of funds. The owner of an account may therefore authorise an exchange of a message or messages (i.e. a transaction) in order to transfer a certain portion of those funds from their account to another account on the network. Such a transaction may occur between accounts which are held by an individual financial institution (such as between two accounts held by first device 2000). Alternatively, such a transaction may occur between two accounts which are held by different financial institutions (such as between a first account held by first device 2000 and a second account held by second device 2002).

As such, more generally, messages are digital signals which are sent (or exchanged) between the nodes in the network, and are thus used in order to convey information to other nodes in a network.

Each of the accounts in the network may, in some examples, be identified by a unique account identifier. In the specific example of FIG. 2 of the present disclosure, this unique account identifier may include a bank number and/or sort code for each account.

Now, in this example, whenever there is a message exchanged between accounts (e.g. a transaction between the accounts) server 1000A is notified of the exchange. Such a notification may comprise information such as the source account (being the account from which the transaction originated), the destination account (being the account to which the transaction is directed) and a message value (such as the size or value of the transaction). However, the notification information is not limited to this information. For example, the notification may also include the date and time of the transaction and/or a unique identifier of the transaction, for example. Further information may be included as required.

Once notified of a transaction, server 1000A may store the information in a storage such as an external database 2006. In this manner, every time a message is exchanged between nodes of the network, the server 1000A may add the information regarding the exchange to the database 2006 or other form of storage.

In this regard, individual transactions between bank accounts in this example can be considered as part of a stream consisting of a sequence of transactions between bank accounts of the network. In an economy such as the United Kingdom, the number of transactions between accounts could reach a rate of around 300 transactions per second. In other example networks, the rate of exchange of messages could be even higher than this. As such, the number of transactions recorded between bank accounts in the banking network can be very high. Some of these transactions can be considered as being related to each other (if they occur between linked accounts, for example). However, other transactions are entirely separate (forming instead, a different set of transactions).

In the present disclosure, a set of messages is a collection of messages (or transactions, in this specific example) which, generally, is associated, or trace back, to a single source (or root) transaction. A set of messages trace the dispersion of funds through a network (i.e. they demonstrate how funds have been exchanged between accounts on the network). A method for building a set of messages through a network of nodes is described in published patent applications EP3629273A1 and EP362955A1. The contents of EP3629273A1 and EP362955A1 are incorporated by reference. In embodiments, the contents of EP3629273A1 and EP362955A1 relating to building the set of messages (including the specific example of building the dispersion tree) are incorporated by reference. A dispersion tree is a specific example of a set of messages (or transactions) between nodes (or accounts) in a network. Therefore, in some examples, a set of messages may be created as a dispersion tree as taught in published patent application EP3629273A1 and EP362955A1, the contents of which is herein incorporated by reference.

The method of building a set of traceable messages through a network of nodes described in EP3629273A1 and EP362955A1 (the contents of which is herein incorporated by reference) can therefore be used in order to convert the stream of transactions between accounts in a network such as that illustrated in FIG. 2 of the present disclosure into a set of connected transactions, thereby tracing the transfer of funds through the network. When a transaction from the stream of transactions is received (such as a transaction from a first account held by first device 2000 and a second account held by second device 2002), the method comprises determining a set of previous transaction through the network with which the received transaction is associated. The set of previous transactions may be referred to as a dispersion tree. In other words, for each transaction which is received (identified by the unique transaction identifier for each transaction), an outbound message is produced which describes the set of previous messages or transaction the received transaction belongs to or is a member of. This information may also be stored in the external database 2006 or other storage. Therefore, while the transactions are identified and recorded as they occur, analysis of the links between the accounts is not performed at that stage.

Figure 3:
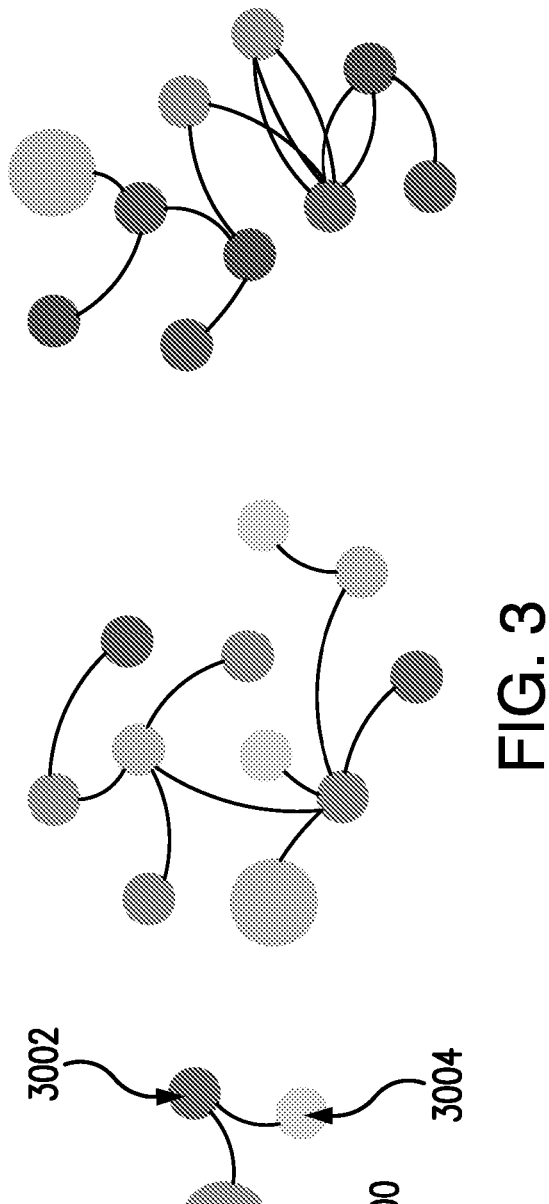
FIG. 3 illustrates a network of nodes in accordance with embodiments of the disclosure.

FIG. 3 illustrates a network of nodes in accordance with embodiments of the disclosure. The nodes of the graph are the bank accounts involved and the edges indicate at least one transaction between the two accounts (see FIG. 3). The mapping from individual dispersion graphs to a common social network allows us to build a complex graphical structure of money laundering behaviours. The large node in FIG. 3 (such as node 3000) represents the victim bank account and all other nodes linked to this large node represent suspect mule accounts (e.g. nodes 3002 and 3004). The edges represent the existence of a relationship between bank accounts (i.e. at least one transaction) and the clockwise direction of the edges represents the flow of funds. It will be appreciated that in the case that there are multiple transactions between the nodes (e.g. multiple transactions between node 3000 and node 3002) a single edge will be produced between those nodes. That is, provided there is at least one transaction between the nodes a relationship will be established. However, it will further be appreciated that two relationships (or edges) can be established between nodes-one edge for a flow of funds in a first direction (i.e. a transaction from node 3000 to node 3002), with a second separate edge for a flow of funds in the other direction (i.e. a transaction from node 3002 to node 3000).

Figure 4:
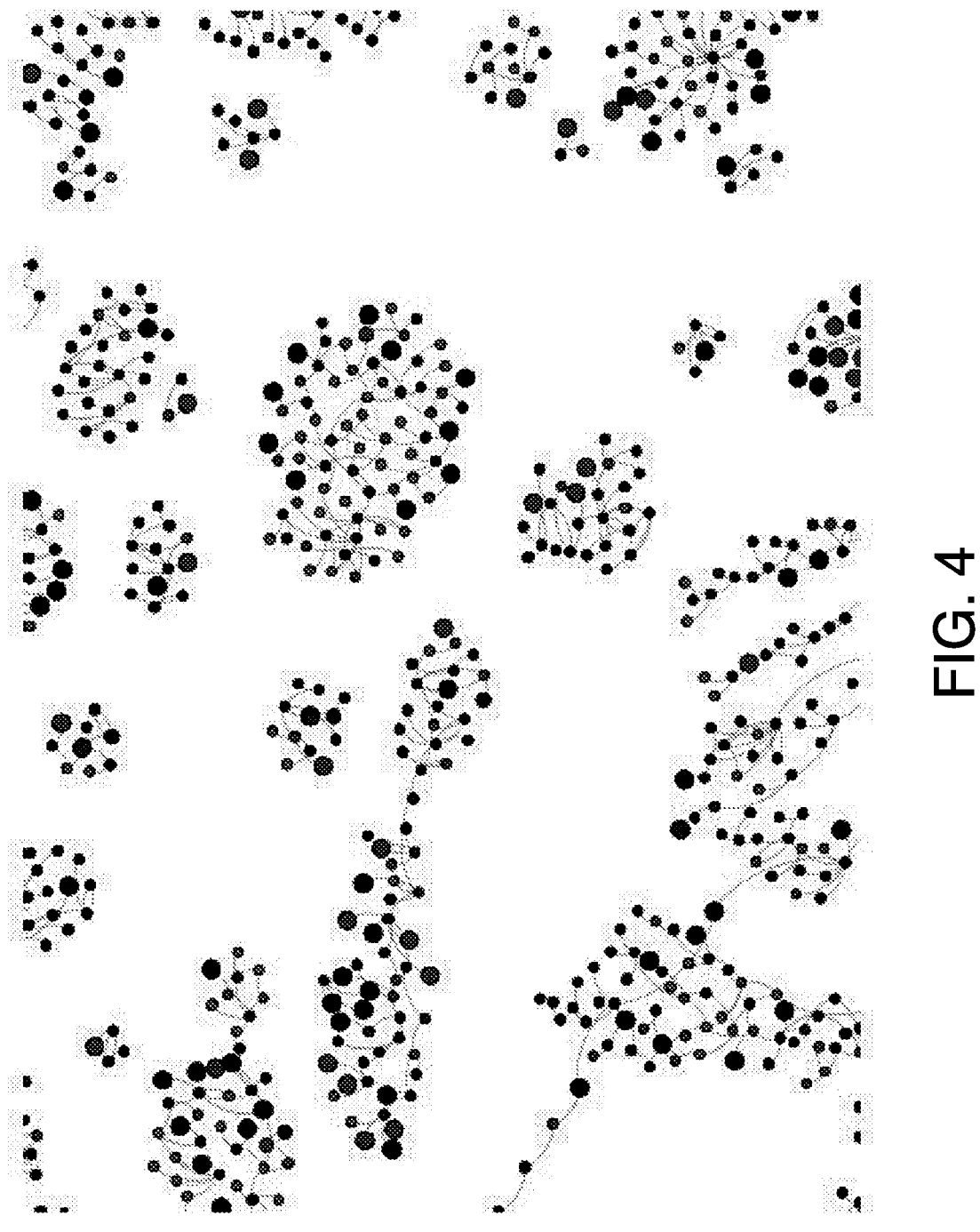
FIG. 4 illustrates a network of nodes in accordance with embodiments of the disclosure.

FIG. 4 illustrates a network of nodes in accordance with embodiments of the disclosure. In contrast to FIG. 3 of the present disclosure, the example of FIG. 4 illustrates a portion of a full network containing many dispersion tress. That is, while FIG. 3 of the present disclosure shows a small collection of dispersion trees FIG. 4 of the present disclosure shows a collection of many different dispersion trees as a portion of all those dispersion trees which may be found in a network. In examples, the collection of many different dispersion trees may form a single set of messages—that is, a set of messages can contain many different dispersion trees. In fact, since bank accounts can appear in multiple trees, they form complex network structures when visualised together in the manner illustrated in FIG. 4 of the present disclosure. In this portion of the network (illustrated in FIG. 4 of the present disclosure) the individual dispersion trees are joined together to form clusters. Some of the clusters and/or some of the message exchanged within those clusters may be related to fraudulent transactions. However, other clusters and/or messages within those clusters may be related to legitimate transactions. As such, as the complexity of the network increases it becomes ever more computationally challenging to identify the fraudulent messages within the network.

Of course, it will be appreciated that the present disclosure is not particularly limited to the details of the dispersion trees illustrated in the examples of FIGS. 3 and 4 of the present disclosure. Moreover, while the method of published patent applications EP3629273A1 and EP362955A1 may be used in order to create a set of messages, the present disclosure is not particularly limited in this regard. More generally, any suitable method may be used in order to trace the transactions through the network and build sets of messages (for related and/or linked dispersion) as required depending on the situation to which embodiments of the disclosure are applied.

Owing to the number of transactions and complexity of the banking network, the trail of dispersion of funds from an initial seed transaction can become very complex in a short period of time. Moreover, owing to the number of transactions and the complexity of the banking network, the number of individual sets of messages (individual dispersion trees) which are created can likewise be very large. Therefore, it can become very computationally challenging to distinguish between sets of messages related to legitimate transfer of funds across a banking network and sets of messages which are related to fraudulent activity in the network (i.e. those sets of messages which have a fraudulent seed transaction).

Moreover, analysing the complete network for sets of messages related to fraudulent transactions is very computationally challenging. As such, there are often significant delays between the time at which the fraudulent activity occurs and the time at which the activity is identified as fraud. This delay enables fraudsters to further disperse stolen funds across the network making it even more difficult to stop the fraudsters and retrieve the stolen funds.

Consider, for example, a banking network such as that of an economy such as that of the United Kingdom. Here, the number of transactions occurring between accounts could reach a rate of around 300 transactions per second. These transactions may relate to a number of different sets of messages (dispersion trees) across the banking network. Therefore, even though the different dispersion trees may be created as the stream of transactions in the network is consumed, it can be very difficult to identify sets of messages which are related to fraudulent or potentially fraudulent activity (as a high number of the sets of messages may instead relate to the legitimate transfer of funds across the network).

As such, for at least these reasons (and also those reasons discussed in the Background of the present disclosure) it is desired that a technical solution is provided which enables messages of interest to be identified with improved accuracy and efficiency within a network of nodes.

Hence, an apparatus, method and computer program product for constructing a set of motifs for use in detecting messages of interest in a network of nodes is provided.
<Apparatus>

Figure 5:
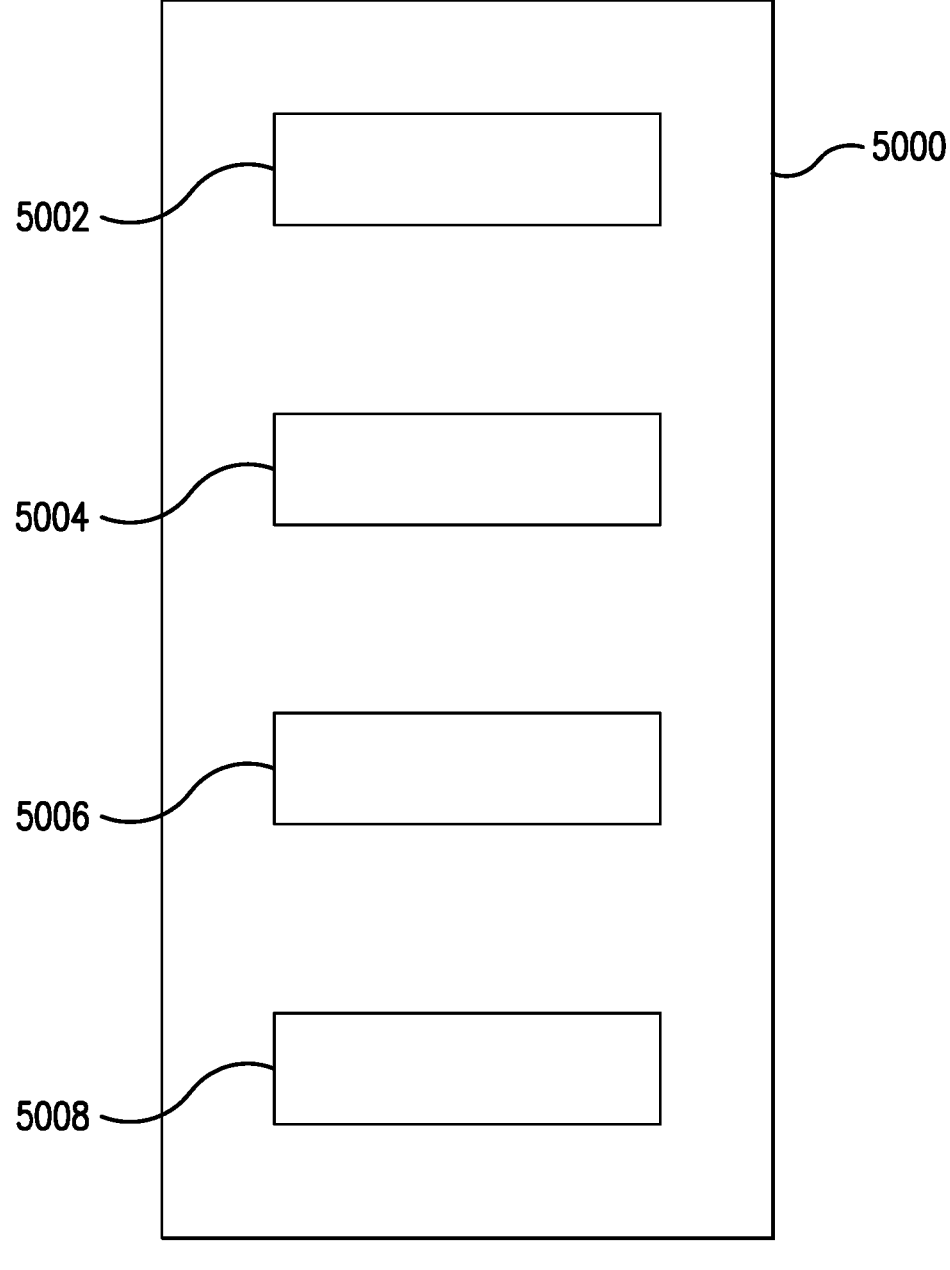
FIG. 5 illustrates an example configuration of an apparatus in accordance with embodiments of the disclosure.

FIG. 5 illustrates an example configuration of an apparatus in accordance with embodiments of the disclosure.

Specifically, FIG. 5 illustrates an apparatus for constructing a set of motifs for use in detecting messages of interest in a network of nodes in accordance with embodiments of the disclosure. In particular, the apparatus illustrated in FIG. 5 of the present disclosure may illustrate a specific configuration of processing circuitry such as processing circuitry 1002 described with reference to FIG. 1 of the present disclosure.

Apparatus 5000 comprises an acquiring unit 5002, a detecting unit 5004, a generating unit 5006 and a constructing unit 5008.

Acquiring unit 5002 is configured to acquire target data, the target data comprising a set of messages which have been exchanged between nodes in the network, the set of messages including a number of messages of interest. Furthermore, acquiring unit 5002 is configured to acquire control data, the control data comprising a set of messages which have been produced based on a random exchange of messages between nodes in the network.

Furthermore, detecting unit 5004 of apparatus 5000 is configured to detect motifs within the target data and the control data, each motif being a repeated pattern of messages appearing within either the target data and/or the control data.

Turning now to the generating unit 5006 of apparatus 5000, it will be appreciated that the generating unit 5006 is configured generate a set of values indicative of a significance of the motifs which have been detected in the target data and the motifs which have been detected in the control data using a frequency with which these motifs have been detected.

Finally, the constructing unit 5008 is configured to construct a set of motifs for use in detecting messages of interest in the network using the set of values which have been produced and a comparison of the motifs detected in the target data with the motifs detected in the control data.

In this manner, the apparatus 5000 of the present disclosure constructs a set of motifs (or patterns of messages or transactions) which can be used in order to identify certain activity of interest in a network can be efficiently and reliably established. Further details regarding apparatus 5000 will be explained with reference to FIGS. 6 to 10 of the present disclosure.

<Acquiring Unit>

As explained with reference to FIG. 5 of the present disclosure, acquiring unit 5002 of apparatus 5000 is configured to acquire target data and control data.

The manner by which the acquiring unit 5002 acquires the target data and the control data is not particularly limited in accordance with embodiments of the disclosure. That is, the acquiring unit 5002 may acquire the relevant data from an external device or storage medium using any suitable wired or wireless connection. In some examples, data (such as the target data) may be stored in a memory or storage device internal to the apparatus 5000. However, in other examples, the data may be stored in an external memory or storage device.

The target data comprises a set of messages which have been exchanged between nodes in the network. As such, the target data provides a set of messages which can be searched for motifs representative of the target activity (e.g. money laundering). In examples, this may include messages such as those illustrated with reference to FIG. 4 of the present disclosure (where a dispersion tree indicative of the messages which have been exchanged in a portion of the network is shown). However, it will be appreciated that the target data is data representative of the messages (or activity) of interest. That is, the target data is data which is selected because it is already known that the activity of interest has occurred within that data.

In some examples, the target data and the set of messages of the control data (described in more detail below) each comprise a connected graph of messages between nodes indicative of a flow of messages between nodes in the network.

Consider the example of a banking network as illustrated with reference to FIG. 2 of the present disclosure. In the example of a banking network, it is often is desired that illicit and/or fraudulent activity (or messages related to that activity) is identified within the network. Accordingly, target data is chosen which shows an example set of messages for illicit and/or fraudulent activity. As the target data shows an example of illicit and/or fraudulent activity, the target data can be analysed to identify certain types of messages (or patterns of messages) which are indicative of this type of activity or behaviour. In other words, the target data is chosen as an example of the types of sets of messages which are observed in the case of the desired activity (being the activity which should be identified in other sets of messages): it is a set of messages (or dispersion tree) which is representative of the types of messages which should be detected amongst other sets of messages.

Accordingly, in the specific example of a banking network, the nodes are bank accounts in the banking network and the flow of messages between bank accounts in the banking network is indicative of a dispersion of funds through the network.

The manner in which the target data is selected is not particularly limited in the present disclosure. In some examples, the target data may be a selection of data which has already been identified as relating to the activity of interest. The target data should include a range of sets of message from different examples of the desired activity in order that the target data provides a representative sample of the types of sets of messages which are associated with that type of activity. The target data should also be of a similar size (including a similar number of nodes, for example) as the control data (described in more detail below). This ensures that a more effective comparison between the target data and the control data can be achieved.

Once the target data has been acquired (or even, in some examples, simultaneous with this acquisition of the target data) the acquiring unit 5002 is configured to acquire the control data. Again, the control data will be understood as a set of messages which can be searched for motifs (i.e. patterns of messages between nodes). However, in contrast to the target data, the control data is not known to exhibit the activity of interest (i.e. illicit and/or fraudulent activity). In fact, in some examples, the control data is simulated data and is not obtained from messages which have actually been exchanged between nodes in the network. More specifically, in some examples the control data may be data indicative of a random exchange of messages between nodes in a network (the underlying network being the same as that of the target data). The control data can be searched for motifs the same as the target data and therefore enables a comparison of the motifs from the target data (related to the activity of interest) with motifs from the control data (being a random exchange of messages in the network unrelated to the activity of interest).

In some examples, the control data may comprise randomly generated Erdos-Reyni graphs. The purpose of the Erdos-Reyni graphs is to quantify the types of motifs that occur in a well understood model of social networks and therefore allows for identification of specific motifs that are only present in the target data (such as a money laundering network or the like). Control data comprising randomly generated Erdos-Reyni graphs allows for particularly reliable identification of types of motifs related only to the target activity (being specific to the target data) as control data generated in this manner is particularly independent of the target activity (e.g. money laundering in the example of a banking network). However, any suitable set of control data (which enables comparison with the motifs detected in the target data) can be used in accordance with embodiments of the disclosure as desired.

In examples, the control data may be stored in a memory or storage unit internal or external to apparatus 5000. The control data can then be retrieved by the acquiring unit 5002 over any suitable wired or wireless connection. However, in some examples the acquiring unit 5002 may also be configured to generate the control data in accordance with a number of pre-set user preferences or user input instructions. In particular, the acquiring unit 5002 may itself be configured to generate the set of messages representative of a random exchange of messages within the target network. However, the present disclosure is not particularly limited in this regard and the acquiring unit 5002 may acquire such control data as has been generated in an external device.

In this manner, the acquiring unit 5002 acquires the target data and the control data.

<Detecting Unit>

As previously described (with reference to FIG. 5 of the present disclosure) the detecting unit 5004 is configured to detect motifs within the target data and the control data which have been acquired by the acquiring unit 5002.

As described with reference to FIG. 2 of the present disclosure, a number of messages may be transmitted or exchanged across a network. In a banking network, a number of these messages may relate to legitimate behaviour (relating to an authorised transaction by the genuine account owner, for example). However, a number of the messages in the network may relate to illicit behaviour. Illicit behaviour may be behaviour related to fraudulent transactions and/or money laundering activity. Considering the example of money laundering activity, it will be appreciated that fraudsters often perform a number of transactions in rapid succession between accounts in order to disperse funds across the banking network. The nature of these transactions is such that it becomes more difficult to trace funds as they are dispersed across the network. However, the types of transactions performed by fraudsters (e.g. a trans-actions related to a rapid exchange of messages between accounts across the network) can be distinguished from the types of transactions which are performed by the legitimate owners of the accounts when performing legitimate trans-actions.

As such, the inventors have realised that the type and nature of transactions (including the pattern of transactions) which are used by fraudsters when engaging in illicit activity can be used as a signature to identify fraudulent (or other-wise illicit) activity (i.e. exchange of messages) within the network.

Accordingly, the detecting unit 5004 of apparatus 5000 is configured in order to detect motifs within the target data (the data including a set of messages which are known to relate to illicit activity) and motifs within the control data (the data which may, in some examples, be simulated data which does not contain messages related to illicit activity). In the present disclosure, a motif is understood as a pattern of messages which is repeated within a set of data.

Consider an example set of messages between a collection of nodes A, B and C in a network. In this example, a first message is sent from node A to node B. Then, a second message is sent from node B to node C. Finally, a third message is sent from node C to node A. Such a set of messages between nodes A, B and C can be understood as a motif (or pattern). This motif may also be observed between different nodes (such as nodes D, E and F) within the network. That is, even though messages are exchanged between different nodes across the network, certain motifs (or patterns of messages) may be repeated a number of times across the network.

The method of detecting motifs used in embodiments of the present disclosure is not particularly limited. That is, any suitable method for detecting repeated patterns of messages within data such as the target data and the control data of the present disclosure can be used as required. Indeed, any suitable method for detecting such motifs known by the skilled person can be employed as desired depending on the situation.

However, in some examples, the motif detection per-formed by detection unit 5004 may be implemented using an algorithm such as that described in Wernicke, S., 2006.

In some examples, the motifs are individual subgraphs within each set of messages and the detecting unit 5004 is configured to detect the motifs within the target data and/or the control data by sampling random subgraphs within the set of messages.

However, in other examples, the motifs are individual subgraphs within each set of messages and the detecting unit is configured to detect the motifs within the target data and/or the control data by enumerating all subgraphs of a predetermined size within the set of messages.

That is, in certain examples, the motif search may be restricted to motifs of size k, where $2 \leq k \leq 5$ (wherein the size of a motif is the number of nodes contained in the motif). Restriction of the size of the motifs to this range has been found to be advantageous for identifying those motifs which can be used for distinguishing between illicit and legitimate behaviour and for improving computational efficiency. In certain examples, no threshold is set for the minimum number of instances (or repetitions) of a given motif that has to be found before the motif is classed as 'detected' within a set of data. As such, the present disclosure is not particu-larly limited to any particular restriction on the size of the motifs to be detected.

It will be appreciated that the detecting unit 5004 is configured to detect motifs in both the target data (money laundering network) as well the control data (e.g. a sample of Erdos-Reyni networks). In certain examples, a large sample of 1000 random graphs based on a Erdos-Reyni model may be used as the control data. The random graphs are, as explained with reference to the acquiring unit 5002, used to sample the motifs that are present in a random realisation of a social network (and thus are not intrinsically related to the messages or activity of interest). This approach provides a well sampled set of motifs from which motifs of the money laundering set can be quantified.

In examples, once the motif detection has been run on each randomly generated graph of the control data, isomor-phic graphs can be removed. Two graphs are described as isomorphic if they contain the same number of vertices connected in the same way. Removing isomorphic graphs essentially is the task of finding identical graphs with a different node labelling, but within the context of this disclosure restricts the sets to be unique.

Removal of isomorphic graphs is not required for the target data when only a single instance of the money laundering network is used.

Table 1 illustrates an example of a unique set of motifs of size $2 \leq k \leq 5$ that were detected from the target data M and control data R in one example of the present disclosure.

TABLE 1

Table showing the unique number of k-sized motifs detected in the target data and the control data in one example.

| k | M | R | M ∩ R | M\R |
|---|---|---|---|---|
| 2 | 2 | 2 | 2 | 0 |
| 3 | 13 | | 7 | 6 |
| 4 | 177 | 31 | 30 | 147 |
| 5 | 2507 | 144 | 137 | 2370 |

In the example of Table 1 of the present disclosure, the ∩ and the \ represent the intersection and difference of M and R respectively. That is, the column M∩R shows the motifs which were detected in both M and R, while M\R shows the number of motifs which were detected in M but not in R.

As seen in Table 1 there are fewer unique motifs detected in the control data (random networks) than in the target data (laundering network) for size k>2. This is because there are significant structural differences in the underlying networks of the target and control data. Put another way, motifs of size k>2 occur with most frequency in the target data and therefore are most strongly correlated with the target activity (e.g. money laundering) in this example. The intersection of the two sets also shows that there are many motifs that are found in the target data (money laundering network) but which were not found at all in the control data (Erdos-Reyni realisations).

Figure 6:
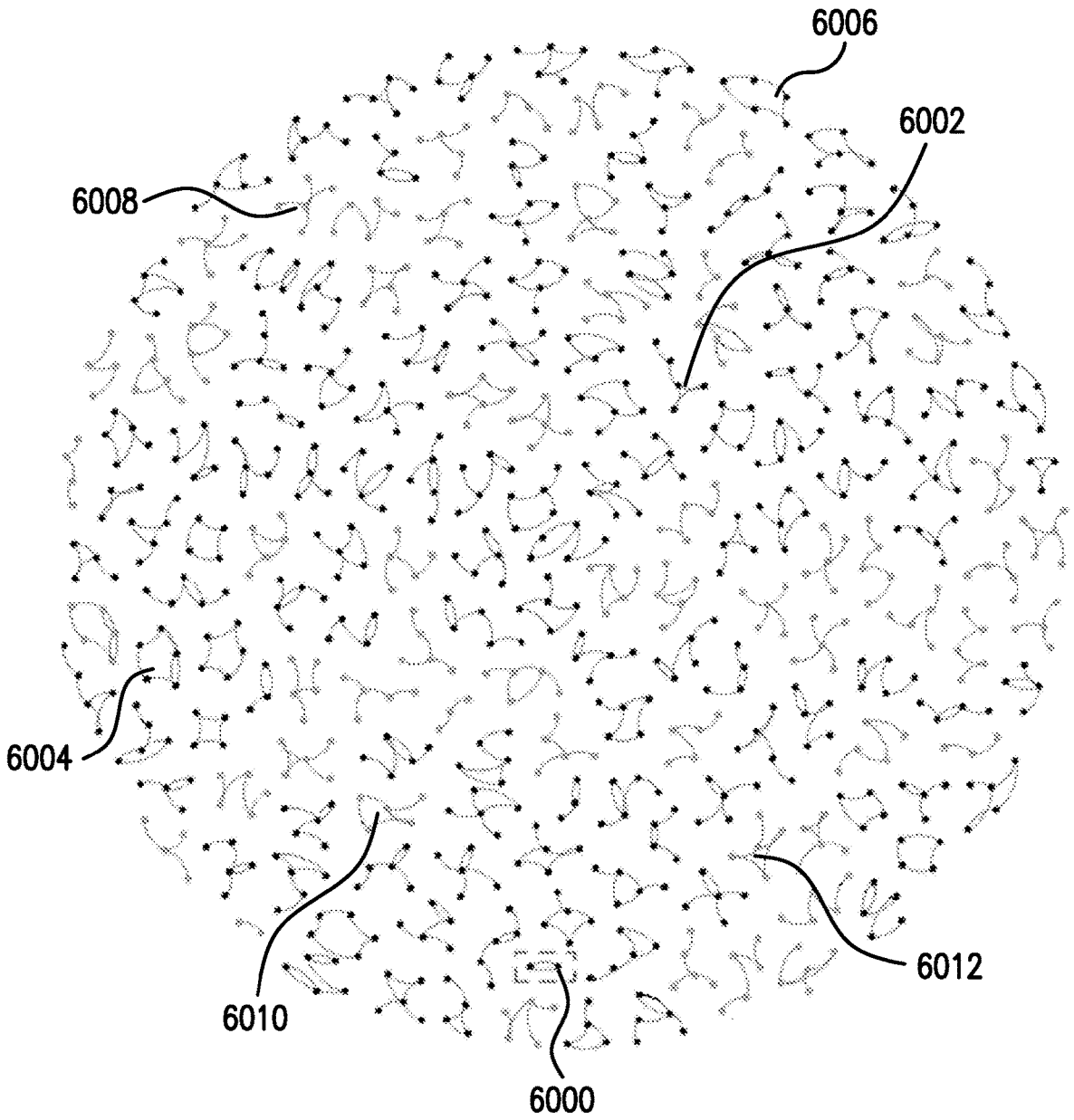
FIG. 6 illustrates a set of motifs in accordance with embodiments of the disclosure.

Turning now to FIG. 6, a set of motifs in accordance with embodiments of the disclosure is illustrated.

Specifically, FIG. 6 of the present disclosure illustrates a collection of motifs which have been detected in an example according to embodiments of the disclosure. In fact, in FIG. 6, the motifs that were found in both the target data (money laundering) and control data (random networks) in the example of Table 1 of the present disclosure are shown. As such, FIG. 6 provides a visual illustration of the motifs M∩R of Table 1 of the present disclosure. The two node motif 6000 highlighted in the box is a cycle motif and represents one of the most prevalent motifs found in the target data (money laundering network), but rarely seen in the control data (Erdos-Reyni network) in this example.

Once the motifs within the target data and the control data have been identified in this manner, the detecting unit 5004 may store the information regarding the motifs which have been found in an internal or external storage unit. The format of the data storage is not particularly limited, but should enable for efficient retrieval of the data when required. Alternatively, in other examples, once the motifs have been detected the detecting unit 5004 may be configured to pass those motifs directly to the generating unit 5006 of apparatus 5000.

In this manner, the detecting unit 5004 is configured to detect motifs within the target data.

<Generating Unit 5006>

Once the motifs have been detected by detecting unit 5004, the generating unit 5006 of apparatus 5000 is configured to generate a set of values indicative of a significance of the motifs which have been detected in the target data and the motifs which have been detected in the control data using a frequency with which these motifs have been detected.

As illustrated in the example of Table 1 and FIG. 6 of the present disclosure, a large number of motifs may be detected within the target data and/or the control data. In fact, a number of these motifs are motifs which may be common to both the target data and the common data (as illustrated in FIG. 6 of the present disclosure, for example). These are the motifs M A R as described above. However, the fact that a motif appears in both the target data and the common data does not prohibit that motif from being used in order to identify the activity of interest (which, in the example of the banking network, is illicit and/or fraudulent activity). That is, even if a motif appears in both the target data and the common data (i.e. forms part of the collection M∩R), that motif may still provide an efficient and reliable indicator of the activity of interest if there is a difference in the way in which that motif appears within the target data and the common data. In particular, a motif may appear with a high frequency within the target data while only appearing with very low frequency in the common data. In this case, if the motif is detected (or detected with sufficient frequency) then it can still be considered as a reliable indicator that a set of messages relates to the activity of interest.

Including certain motifs from M∩R within the set of motifs for detection of the messages of interest has been found to improve the efficiency and reliability of detection of the messages of interest. Put another way, despite the fact that these motifs appear within the control data, the motifs can still provide strong indication of the presence of messages of interest when analysed accordingly.

As such, generating unit 5006 of apparatus 5000 is configured to produce a value indicative of the significance of each of the motifs which have been detected based upon the frequency at which those motifs have been detected.

In some examples, the value indicative of the significance of a motif can be determined based on a comparison of the frequency of appearance of that motif against the frequency of appearance of other motifs within the data. For example, the motifs which have been detected within the data (such as within the target data) may be ranked based on the frequency of their appearance. Then, the top most frequently appearing motifs within that data may be identified as the most significant motifs which have been detected. In other examples, motifs may be assigned a value in accordance with whether the frequency of detection in that data exceeds one or more predetermined threshold values (with only motifs exceeding the predetermined threshold value being identified as the most significant motifs within the data).

However, in some examples, a 'z-score' can be calculated as the value indicative of the significance of the motifs which have been detected, which is a simple measure of how likely an observed value is relative to a mean. The z-score for a particular motif is then defined in Equation (1) as:

$$\frac{N_i - \langle N_i^s \rangle}{\sqrt{\langle (N_i^s)^2 \rangle - \langle N_i^s \rangle^2}} \tag{1}$$

where $N_i$ is the frequency with which motif i is present, and $$N_i^s$$

is the count of the same motif but on a shuffled network-a random rewiring of the graph that preserves the degree sequence of the original graph. Any suitable method may be used in order to perform a random rewiring of the graph as required—the present disclosure is not particularly limited in this regard. The $\langle \ \rangle$ represents the ensemble averages of the relevant quantities over a sample of shuffled networks. $Z_i$ measures the fluctuation in each motif's count in a given network with respect to an ensemble of random shuffles of that network that have the same degree distribution. Comparison of the ensemble averages of the frequency with which the motif is present in the data with that of the shuffled data in this manner enables the significance of the motif to be determined as the most significant motifs (being those which are the most reliable indicator of the activity of interest) will have a high discrepancy between frequency of appearance within the data compared to frequency of appearance in the shuffled data. That is, the most significant motifs are those motifs which appear most frequently in the data while appearing with very low frequency in the shuffled version of that data. These motifs are reliable indicators of the target data as they are the motifs most unlikely to occur by chance.

Use of the z-score as the value indicative of the significance of the motifs which have been detected is advantageous as the z-score provides an efficient and reliable method for determining the most significant motifs which have been detected (compared to those which would be expected to form based on a random wiring of the network). However, the present disclosure is not particularly limited in this regard. Rather, any suitable method for generating the value indicative of the significance of the motifs based on the frequency with which those motifs have been detected can be used in accordance with embodiments of the disclosure.

It will be appreciated that the generating unit 5006 generates the set of values indicative of the significance of the motifs which have been detected based for the motifs detected in both the target data and the motifs which have been detected in the control data respectively.

In this manner, generating unit 5006 is configured to generate a set of values indicative of the significance of the motifs which have been detected.

<Constructing Unit 5008>

As previously described, constructing unit 5008 is configured to construct a set of motifs for use in detecting messages of interest in the network using the set of values which have been produced and a comparison of the motifs detected in the target data with the motifs detected in the control data. These motifs are constructed from a selection of motifs which have been detected in the target data and/or the control data by detecting unit 5004.

That is, once the detecting unit 5004 has detected the motifs which are present within in the target data and the control data, and once the generating unit 5006 has generated the values indicative of the significance of the motifs which have been detected, the constructing unit 5008 can use this information in order to select the motifs which, as a set (or collection) provide the most reliable and efficient indicators of the target activity.

As explained with reference to the generating unit 5006, the set of motifs which are selected may include motifs which are present only in the target data (and not the control data) as well as motifs which are present within both the target data and the control data.

In this regard, a comparison of the set of values which have been produced by the generating unit 5006 for the motifs detected by the detecting unit 5004 allows for the construction of a set of motifs that are the most reliable and efficient indicators of the activity of interest (e.g. money laundering). Firstly, these values can be used in order identify motifs which, although present in both the target data and control data, provide significant indicators of the activity of interest. Furthermore, these values can be used in order to identify which of the motifs found only in the target data (and not the control data) are the most significant for detection of the activity of interest.

Figure 7:
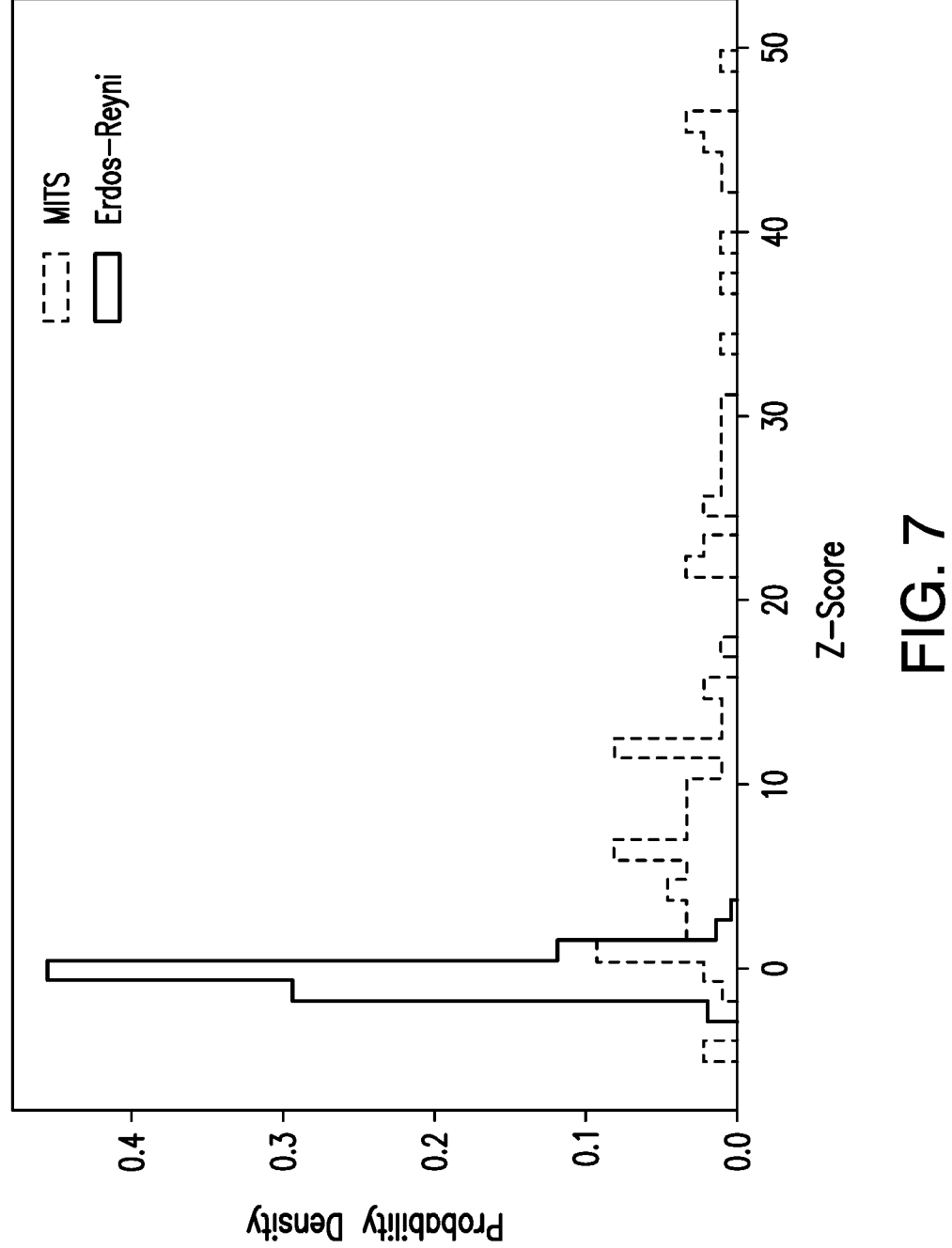
FIG. 7 illustrates an example distribution of values of significance in accordance with embodiments of the disclosure.

FIG. 7 illustrates an example distribution of values of significance in accordance with embodiments of the disclosure. Specifically, FIG. 7 illustrates a comparison of the distribution of the un-normalised values of significance for the motifs as measured from the target data (e.g. money laundering network) and control data (e.g. a random Erdos-Reyni network). These motifs are the motifs M∩R as described with reference to Table 1 of the present disclosure (i.e. the motifs found in both the target and control data). In this specific example, the values of significance are z-scores which have been computed using Equation (1) of the present disclosure.

The distribution of z-scores for the control data (Erdos-Reyni network) is narrow around 0. This is because random reshuffles of the control data (being, itself, randomly generated sets of messages) should produce similar networks, and significant motifs would not be expected in this regard. In other words, the difference between the frequency at which a motif is present in the control data and the frequency at which that motif is present within a random shuffle of the control data is low. As such, few significant motifs are seen in the control data.

In contrast the target data (money laundering) motifs show a much broader range in significance. Importantly, FIG. 4 shows that while certain motifs are present in both the target data and the control data, the way in which those motifs present themselves in both target data and the control data is markedly different (when observed using the values of significance produced by the generating unit 5006 of the apparatus 5000). As such, these motifs of high significance can be used in order to identify the activity of interest in a target network.

Consider again the example of FIG. 6 of the present disclosure. The two node "cycle" motif 6000 of FIG. 6 of the present disclosure is an example of this difference between motifs present in both the control data and the target data. This 'cycle' motif 6000 was found in large numbers in the target data but not in the graph produced by randomly rewiring it in this specific example. Accordingly, this motif has a very high level of significance for the target data (which exemplifies the activity of interest). In other words, this motif 6000 does not frequently arise in a random exchange of messages, but appears very frequently in the target data. As such, presence of this motif is strongly correlated with the messages of interest (i.e. money laundering activity).

In contrast, this same motif—while found in the control data (e.g. Erdos-Reyni model)—is rarely seen with a mean frequency of 0.8 and a standard deviation of 1 in this specific example. Moreover, this motif was seen in the random rewiring of the control data with a similar frequency to that in which it appears in the control data as such. Accordingly, the level of significance of this motif in the control data (which exemplifies data devoid of the activity of interest) is very low.

By analysing the target data and control data for the specific example of money laundering activity, specific individual motifs—such as motif 6000—which can be used in order to identify occurrence of money laundering or messages of interest in a network can be identified.

Indeed, it will be understood that this cycling motif 6000 indicates behaviour known in money laundering such as transferring funds between two accounts to make the accounts appear safe to banks. Therefore, the underlying behaviour which leads to the detection of these significant motifs can be fully understood and linked to the messages of the target data.

In FIG. 6, motifs including motifs 6002, 6004 and 6006 are motifs which occur in both the target data and the control data, and which have a significance in the target data greater than or equal to 5 (e.g. z≥5). Accordingly, in examples these motifs can be considered to represent the most significantly occurring motifs. The constructing unit 5008 can therefore include these motifs in the set of motifs for detection of the message or activity of interest within the network. In contrast, motifs such as 6008, 6010 and 6012 have a significance in the target data of less than 5 (e.g. z<5) and as such, in this example, are not considered reliable indicators of the activity of interest.

However, while certain individual motifs are illustrated in this example, it will be appreciated that the present disclosure is not particularly limited in this regard. The specific motifs which are observed will depend, at least in part, on the type of behaviour which is being analysed (i.e. on the target data itself). For example, the motifs which are found for a first type of behaviour (such as money laundering) may be different that the motifs found for other types of fraudulent and/or illicit behaviour. Moreover, the motifs found in a certain type of activity (such as money laundering) may develop over time as fraudsters change the pattern of their behaviour. As such, it is necessary to update the target data which is used to derive the set of motifs to account for changes in behaviour.

Moreover, while certain individual values are indicated as the predetermined threshold level of significance for selection of a motif as part of the set of motifs for the detection of the messages of interest (e.g. a significance level of 5 as discussed with reference to FIG. 6 of the present disclosure) it will be appreciated that the present disclosure is not particularly limited in this regard. A much higher or much lower predetermined threshold can be set depending on the situation. Indeed, the predetermined threshold value may be adapted by the constructing unit 5008 in accordance with factors such as the number of motifs which have been detected and/or the average level of significance of these motifs. Furthermore, if none of the motifs found in both the target data and the control data meet the required level of significance, the constructing unit 5008 may determine that none of the motifs common between the target and control data should be included as part of the set of motifs.

Figure 8:
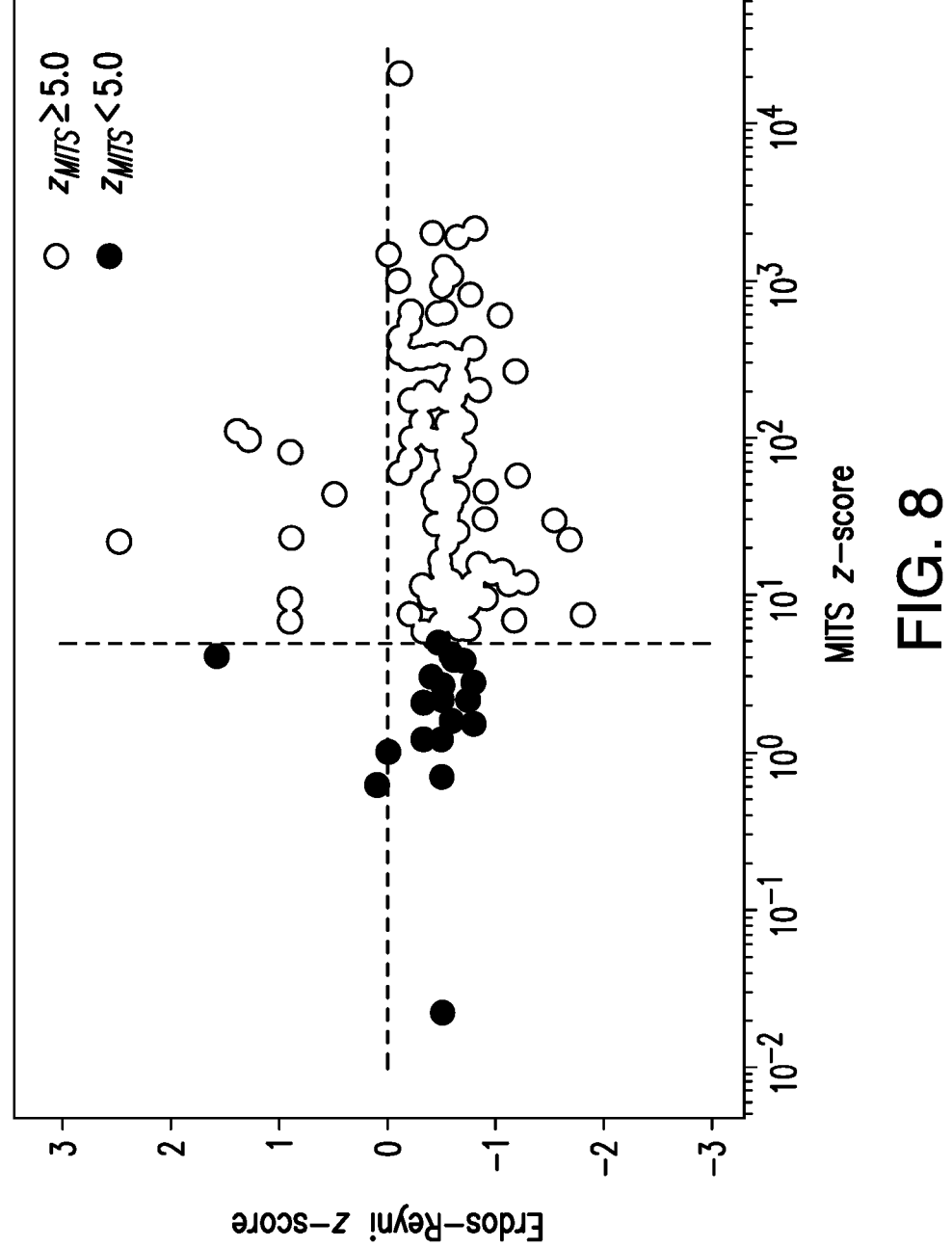
FIG. 8 illustrates an example distribution of values of significance in accordance with embodiments of the disclosure.

Turning now to FIG. 8 of the present disclosure, an example distribution of values of significance in accordance with embodiments of the disclosure is illustrated. Specifically, FIG. 8 shows the comparison of the values of significance (e.g. z-scores) from both the target data (e.g. money laundering network-MITS) and control data (e.g. Erdos-Reyni networks) for the intersecting set of motifs. In this example, $z_{MITS}$ represents the scores of the motifs in the money laundering network and we highlight those with a $z_{MITS} \geq 5.0$ as a suitable choice to construct a set of 117 unique motifs of size $2 \leq k < 5$, since this set are significant in the target data but not so in the control data. However, as explained above, the present disclosure is in no way limited to this predetermined threshold value.

In fact, in some examples, the constructing unit 5008 may be configured to construct a set of motifs from motifs present in both the target data and the control data and where the motifs have a significance value for the target data above a first predetermined threshold and a significance value for the control data below a second predetermined threshold. Hence, only motifs which have a high degree of significance in the target data but a low degree of significance in the control data are selected for the set of motifs for the detection of the activity of interest thus further improving the reliability and efficiency of the detection of messages of interest.

In this manner, the constructing unit 5008 can select motifs which should be included in the set of motifs for detection of the messages of interest (relating to certain activity of interest) from amongst those motifs found in both the target and control data.

As described with reference to Table 1 of the present disclosure, the motifs which have been detected by detecting unit 5004 may also include a number of motifs which are found only in the target data (and not the control data). The constructing unit 5008 can also include a number of these motifs in the set of motifs for detection of the messages of interest. In fact, in some examples, all those motifs found only in the target data may be included in the set of motifs. However, in other examples, it is advantageous that a selection is made by the constructing unit as to which of the motifs (if any) from the motifs detected only in the target data provide significant and reliable indicators of the messages of interest.

Specifically, for the present example, Table 1 of the present disclosure shows that there are a large number of motifs that were found solely in the target data (e.g. money laundering network) and not in the control data (e.g. the random models). From this set it is desirable to pick a set that can be used along with those selected from the set M∩R to further enhance the ability to identify the messages of interest. In one example, a sub-set of motifs from those motifs found solely in the target data can be chosen by the constructing unit 5008 through identification of a 'rare' set of motifs. In particular, it is understood that 'rare' motifs are those motifs that are significant, i.e. have a high score, but are also plentiful enough (i.e. have high enough frequency) such that they are informative when utilised. In other words, it is desired that the constructing unit 5008 identifies high significance motifs with a non-zero probability of appearing in a set of messages of interest. From the 2523 money laundering motifs of the specific example of Table 1 found solely in the target data, only 66 have a significance of $z_i \geq 5$ and have a frequency in the network of ≥1100, where 1100 represents 10% of the dispersion graphs that make up the network. In other words, only 66 motifs appearing solely in the target data have a significance of $z_i \geq 5$ while appearing in at least 10% of the instances of the target activity (money laundering) in the target data. These 66 motifs are shown in the example of FIG. 9 of the present disclosure.

Figure 9:
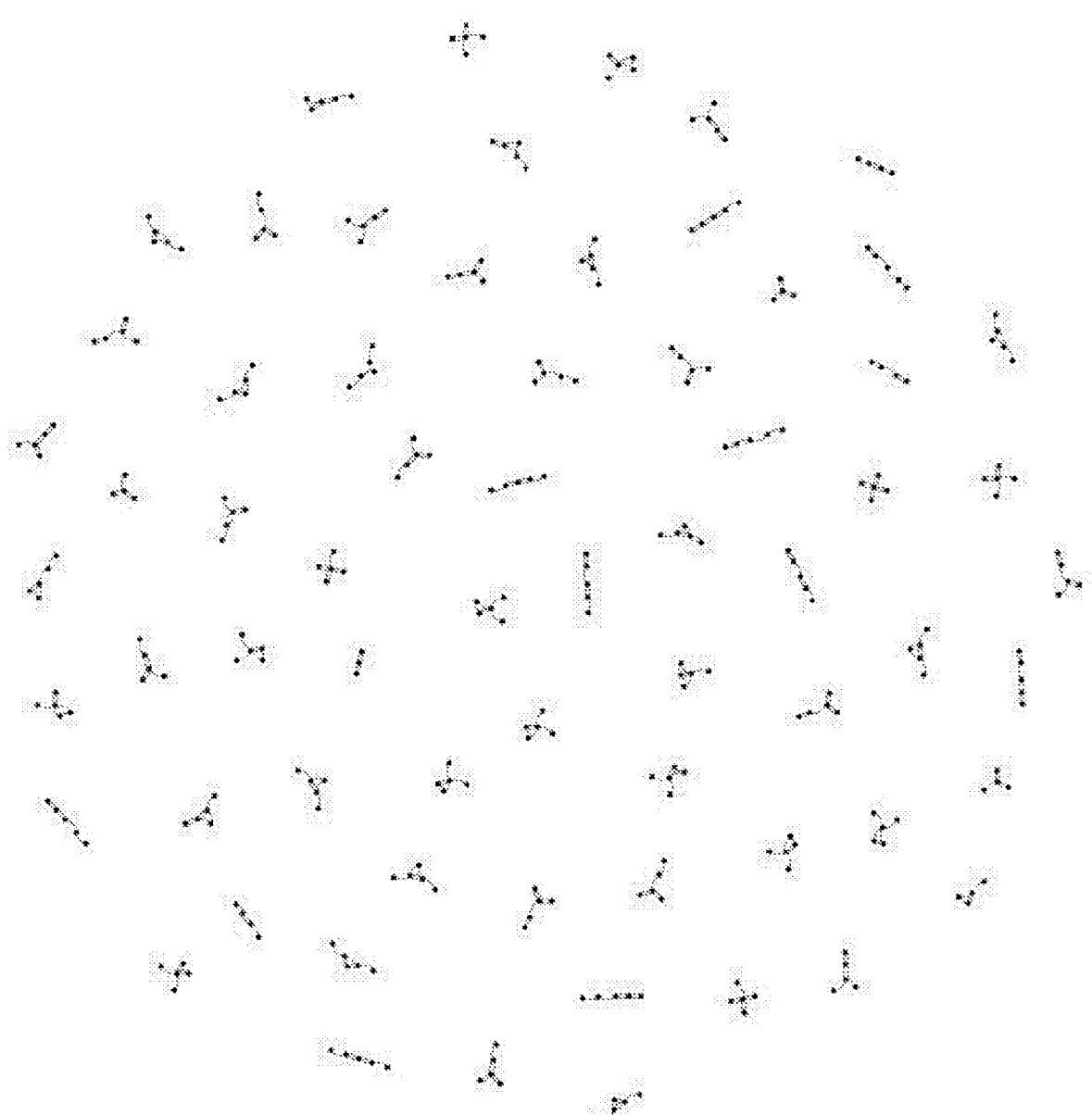
FIG. 9 illustrates a set of motifs in accordance with embodiments of the disclosure.

FIG. 9 illustrates a set of motifs in accordance with embodiments of the disclosure. That is, FIG. 9 of the present disclosure illustrates those motifs which are selected from the motifs appearing only in the target network for inclusion in the set of motifs for selection of the messages of interest.

Again, it will be appreciated that the constructing unit 5008 is not particularly limited to the use of the predetermined threshold values described in this example for the value of significance and the frequency of appearance—these values can be much higher or much lower than described in this example.

Figure 10:
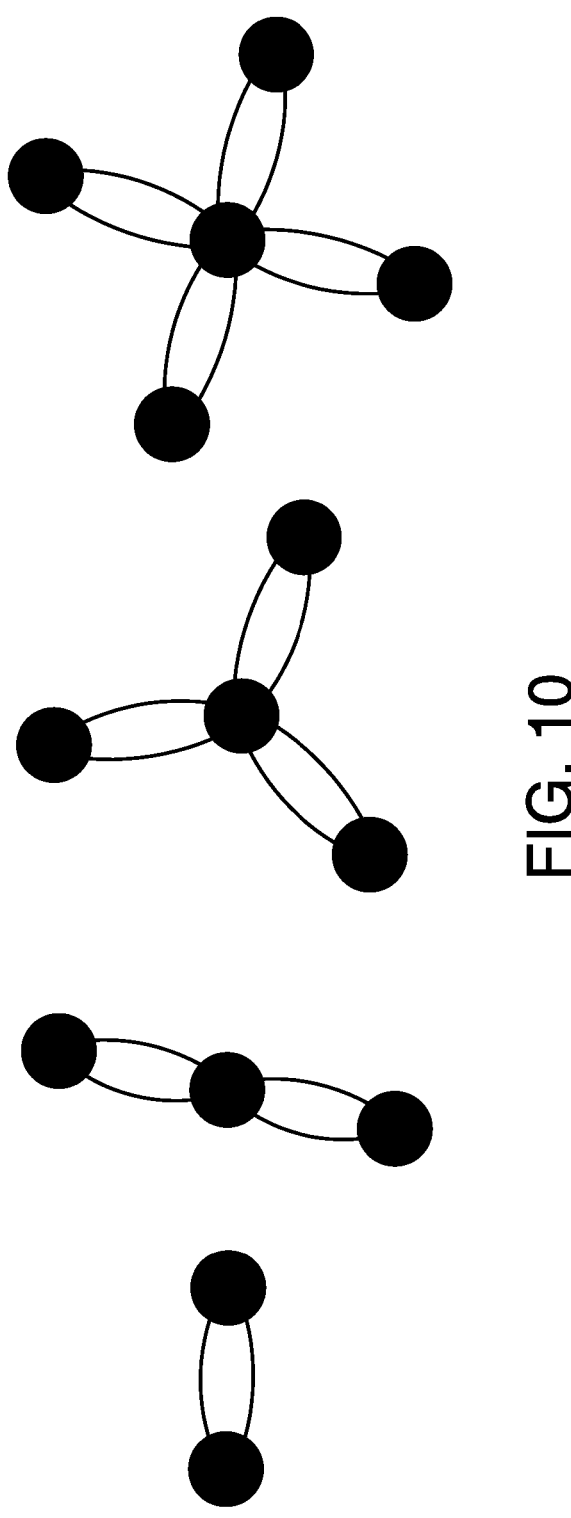
FIG. 10 illustrates a set of motifs in accordance with embodiments of the disclosure.

FIG. 10 of the present disclosure illustrates an example of motifs related to messages of interest in accordance with embodiments of the disclosure.

In particular, from the example set of motifs illustrated in FIGS. 6 and 9 of the present disclosure, it is apparent that many of the money laundering motifs (being the messages/activity of interest in this specific example) have cycles in them. As previously mentioned, the cycling of funds is a behaviour in money laundering that we can now see in the directly in the network data (i.e. the motifs which have been selected).

Indeed, FIGS. 9 and 10 illustrate the idea of 'motif families' where certain motifs that are of different sizes exhibit commonalities. This is shown in more detail in FIG. 10 of the present disclosure, where an example of a motif family from FIG. 9 of the disclosure are illustrated. The individual motifs of FIG. 10 of the present disclosure are clearly related to each other. That is, the two node cycle motif is the common feature between all the participants in this example.

Notably, these motifs can be considered as related to each other from an evolutionary point of view (i.e. a temporal evolution). Since these structures represent financial relationships, underlying an edge is at least one transaction that occurred at some point in time. Hence, if more time passed additional edges of the motifs may be completed.

Hence, in this manner, the constructing unit 5008 can select motifs for the set of motifs from amongst those motifs which appear only in the target data. The selected motifs are those motifs which are particularly efficient and reliable when used for detection of messages of interest in a network.

Once the set of motifs have been constructed, those motifs can be stored in a secure storage or memory location in order that they can be efficiently retrieved when required for detection of messages of interest in a network. Moreover, these motifs of the set of motifs can be updated as new data (of the target data and/or the control data) becomes available. In some examples, the set of motifs may be periodically updated (such as after a predetermined period of time) in order to improve computational efficiency and ensure that the set of motifs are the most efficient and up-to-date set of motifs available for detection of the messages of interest. This ensures that changes in the underlying behaviour related to the activity of interest can be accounted for in full.

In this manner, the constructing unit 5008 is configured to construct a set of motifs for use in detecting messages of interest in the network.

<Advantageous Technical Effects>

According to embodiments of the disclosure, a set of motifs (or patterns of messages or transactions) which can be used in order to identify certain activity of interest in a network can be efficiently and reliably established. These motifs can be used in order to identify the activity of interest with increased speed and computational efficiency. In a banking network, for example, this enables fraudulent activity to be rapidly and efficiently identified. Accordingly, the fraudulent activity can be disrupted more effectively.

Of course, it will be appreciated that the present disclosure is not particularly limited to these advantageous technical effects. Other technical effects will be apparent to the skilled person when reading the disclosure.

<Method>

Figure 11:
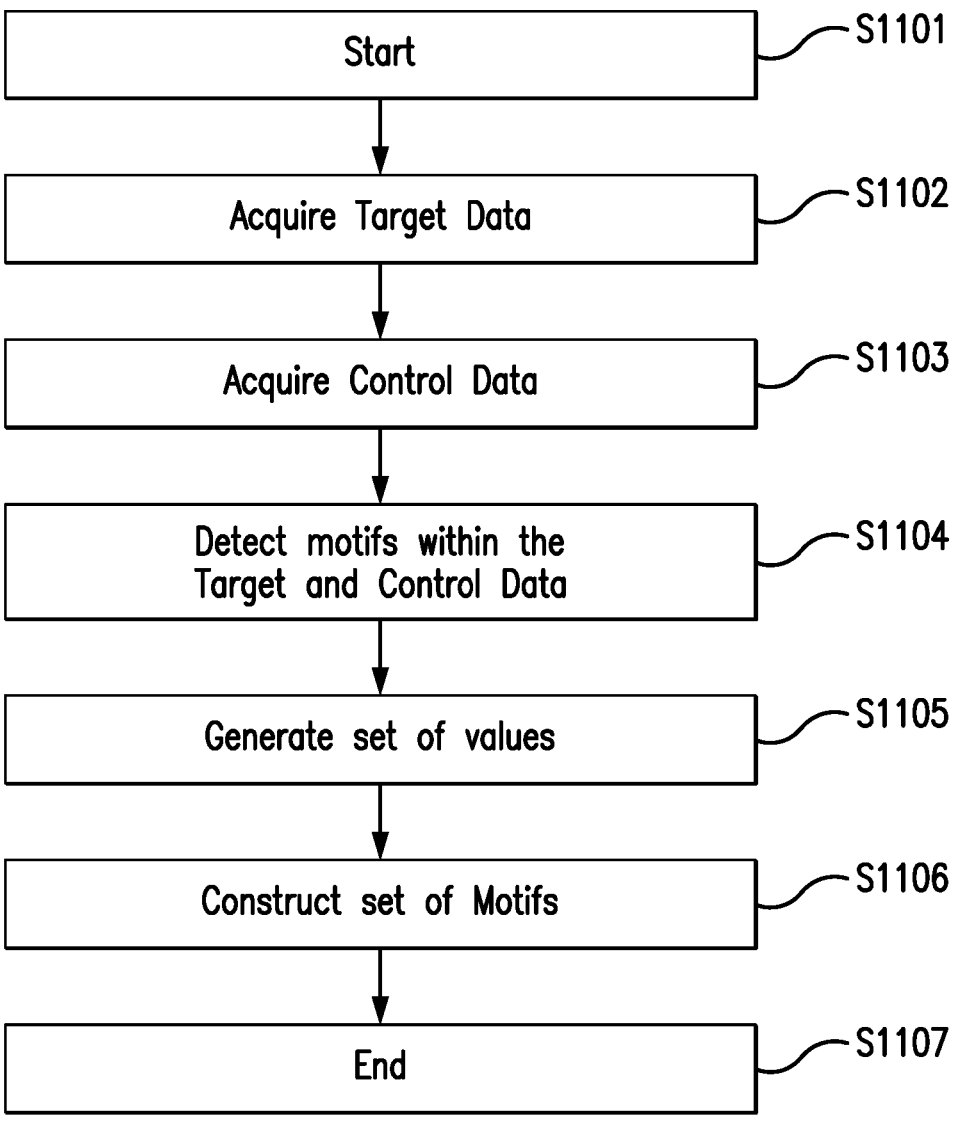
FIG. 11 illustrates a method in accordance with embodiments of the disclosure.

Hence, more generally, a method of constructing a set of motifs for use in detecting messages of interest in a network of nodes is provided in accordance with embodiments of the disclosure. FIG. 11 of the present disclosure illustrates an example method in accordance with embodiments of the disclosure.

The method starts at step S1101 and proceeds to step S1102.

In method step S1102, the method comprises controlling circuitry to acquire target data, the target data comprising a set of messages which have been exchanged between nodes in the network, the set of messages including a number of messages of interest.

In method step S1103, the method comprises controlling circuitry to acquire control data, the control data comprising a set of messages which have been produced based on a random exchange of messages between nodes in the network.

Then, in method step S1104, the method comprises controlling circuitry to detect motifs within the target data and the control data, each motif being a repeated pattern of messages appearing within either the target data and/or the control data.

Once the motifs have been detected, the method proceeds to step S1105.

In step S1105, the method comprises controlling circuitry to generate a set of values indicative of a significance of the motifs which have been detected in the target data and the motifs which have been detected in the control data using a frequency with which these motifs have been detected.

Then, in step S1106, the method comprises controlling circuitry to construct a set of motifs for use in detecting messages of interest in the network using the set of values which have been produced and a comparison of the motifs detected in the target data with the motifs detected in the control data.

The method then proceeds to and ends with method step S1107.

Of course, it will be appreciated that the method of the present disclosure is not particularly limited to the example method steps, or order of these method steps, illustrated in FIG. 11 of the present disclosure. In particular, it will be understood that in some examples it may be advantageous if a number of the method steps are performed in a different order to that illustrated in FIG. 11 of the present disclosure. In particular, a number of these method steps may in fact be performed in parallel. For example, the step of acquiring the target data and the step of acquiring the control data may be performed in parallel.

Alternatively, or in addition, the step of detecting the motifs and/or the set of generating the set of values indicative of the significance of the motifs may also be performed in parallel as the data is being acquired and/or processed.

Nevertheless, FIG. 11 illustrates one example of a method of constructing a set of motifs for use in detecting messages of interest in a network of nodes in accordance with embodiments of the disclosure.

<Detection of Messages of Interest>

Once the set of motifs have been constructed (following the method of FIG. 11 of the present disclosure, for example), these motifs can be used in order to detect messages of interest within a network of nodes. Accordingly, an apparatus, method and computer program product for using a set of motifs in detection of messages of interest in a network of nodes is provided in accordance with embodiments of the disclosure.

<Apparatus>

Figure 12:
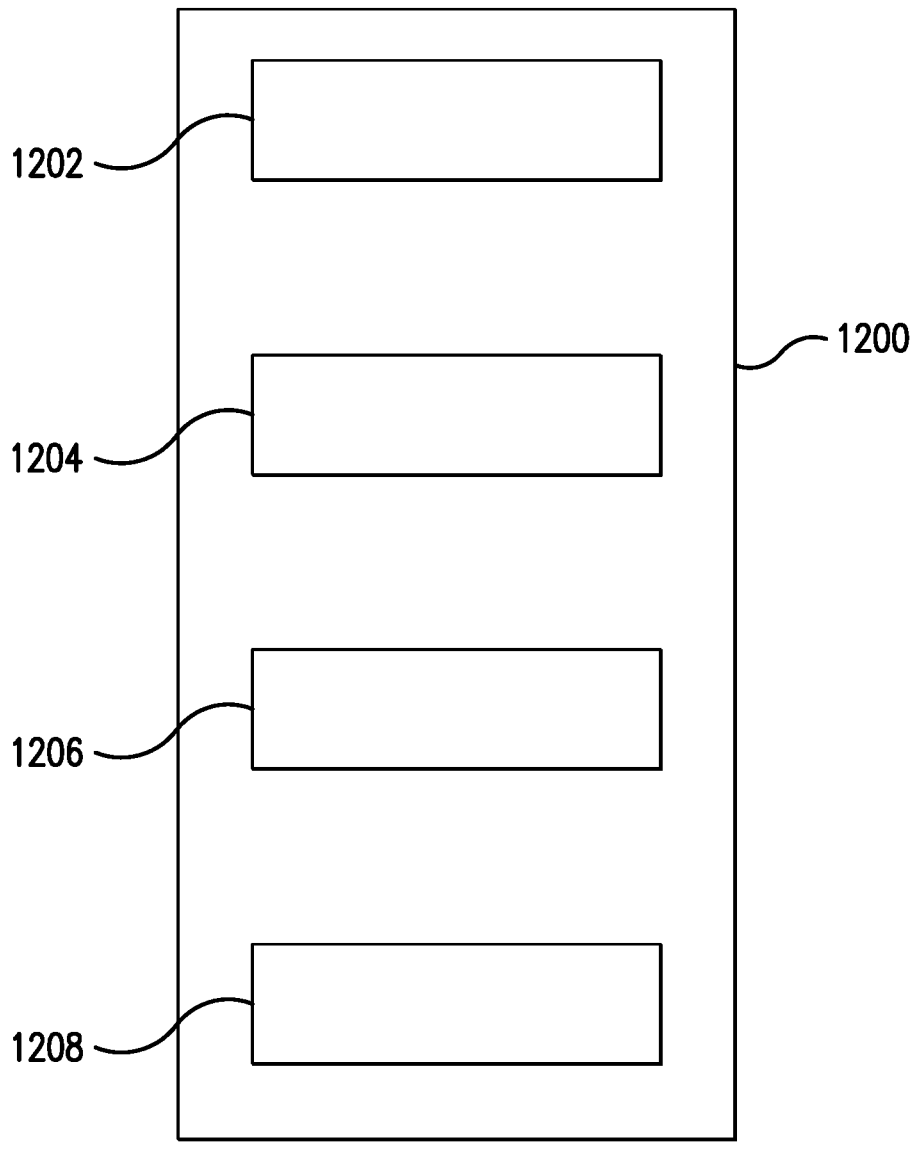
FIG. 12 illustrates an example configuration of an apparatus in accordance with embodiments of the disclosure.

FIG. 12 of the present disclosure illustrates an apparatus for using a set of motifs in detection of messages of interest in a network of nodes in accordance with embodiments of the disclosure. In particular, the apparatus illustrated in FIG. 12 of the present disclosure may illustrate a specific configuration of processing circuitry such as processing circuitry 1002 described with reference to FIG. 1 of the present disclosure.

Apparatus 1200 comprises an acquiring unit 1202, a detecting unit 1204 and an identifying unit 1206.

Acquiring unit 1202 is configured to acquire a set of motifs for use in detecting messages of interest in the network of nodes. In embodiments, the set of motifs may have been constructed by an apparatus such as apparatus 5000 described with reference to FIG. 5 of the present disclosure.

Furthermore, acquiring unit 1202 is configured to acquire second data, the second data comprising a set of messages which have been exchanged between nodes in the network.

Detecting unit 1204 of apparatus 1200 is configured detect motifs within the second data, each motif being a repeated pattern of messages appearing within the second data.

Finally, identifying unit 1206 is configured to identify messages of interest by comparing the set of motifs with the detected motifs within the second data.

In this manner, apparatus 1200 is configured to use a set of motifs which have been constructed in order to identify messages of interest within a network of nodes with increased speed and efficiency.

<Acquiring Unit 1202>

As described above, the acquiring unit 1202 is configured to acquire a set of motifs for use in detecting messages of interest in the network of nodes.

A detailed explanation of the features of acquiring unit 1202 of apparatus 1200 that are the same as have been described for acquiring unit 5002 of apparatus 5000 will not be repeated in full for brevity of disclosure.

The acquiring unit 1202 may be configured to acquire the set of motifs for use in detection of messages of interest from a memory unit or storage device. The set of motifs for use in detection of messages may be a set of motifs such as that produced by apparatus 5000, for example.

In fact, in embodiments, the acquiring unit may acquire the set of motifs directly or indirectly from the constructing unit 5008 of apparatus 5000.

The acquiring unit 1202 may be a communication circuitry as described with reference to FIG. 1 of the present disclosure. Furthermore, the acquiring unit 1202 may acquire the set of messages by any suitable wired or wireless communication.

The method of acquiring the set of motifs (and the data format of those motifs) is not particularly limited in accordance with embodiments of the disclosure. Indeed, this will depend at least in part on the type of data (including the messages of interest) for which the set of motifs were constructed.

In this manner, the acquiring unit 1202 of apparatus 1200 acquires the set of motifs to use in the detection of the messages of interest.

Furthermore, the acquiring unit 1202 is configured to acquire second data.

The second data, in the present disclosure, is data which is to be searched for messages of interest. That is, unlike the target data of the present disclosure (which is known to exhibit the activity of interest—that is, known to contain messages pertaining to the activity of interest) the second data is data for which it is not yet known whether or not said second data relates to the activity of interest. In examples, the second data is a set of messages which have been exchanged between nodes in a network. In fact, in a specific example of a banking network such as that described with reference to FIG. 2 of the present disclosure, the second data is a set of transactions between bank accounts in the network which should be inspected for fraudulent and/or illicit activity (such as money laundering activity or the like).

The form of the second data is not particularly limited in accordance with embodiments of the disclosure. However, in some examples, the second data may include a set of messages constructed in accordance with the method for building a set of messages through a network of nodes as described in published patent applications EP3629273A1 and EP362955A1. In particular, the second data may include a set of messages built as a stream of messages between accounts in a banking network is processed. However, the present disclosure is not particularly limited to this specific example of a method for building a set of messages between nodes in a network.

In this manner, acquiring unit 1202 acquires a set of motifs and second data in accordance with embodiments of the disclosure.

<Detecting Unit 1204>

As explained above, detecting unit 1204 is configured to detect motifs within the second data, each motif being a repeated pattern of messages appearing within the second data.

A detailed explanation of the features of detecting unit 1204 of apparatus 1200 that are the same as have been described for detecting unit 5004 of apparatus 5000 will not be repeated in full for brevity of disclosure. Nevertheless, it will be appreciated that the detecting unit 1204 is configured to detect a number of motifs which occur in the second data which has been received. These motifs are repeated patterns of messages which occur between the nodes of the network in the second data.

The method of detecting motifs used in embodiments of the present disclosure is not particularly limited. That is, any suitable method for detecting repeated patterns of messages within a data such as the target data and the control data of the present disclosure can be used as required. Indeed, any suitable method for detecting such motifs known by the skilled person can be employed as desired depending on the situation. However, in some examples, as described also for detecting unit 5002 of apparatus 5000, the motif detection performed by detection unit 5004 may be performed using an algorithm such as that described in Wernicke, S., 2006.

Once the motifs in the second data have been detected, the motifs may be stored in an internal or external memory unit. Alternatively, in some examples, they can be passed directly to identifying unit 1206 for further processing.

In this manner, detecting unit 1204 detects motifs present in the second data.

<Identifying Unit 1206>

As described above, identifying unit 1206 is configured to identify messages of interest by comparing the set of motifs with the detected motifs within the second data.

Consider again the set of motifs produced by constructing unit 5008 as illustrated with reference to FIGS. 6 and 9 of the application as filed. These motifs (such as the motif 6000) of FIG. 6, are motifs which have been identified as being good indicators of the activity of interest (in this case, messages related to money laundering activity). These motifs are included in the set of motifs which are acquired by acquiring unit 1202 of apparatus 1200.

As explained, detecting unit 1204 detects motifs which are present in the second data (being the data for which, in this example, is data which should be searched for money laundering activity). Indeed, detecting unit 1204 may have detected a large number of motifs within the second data. However, through comparison of the motifs detected from the second data with the motifs in the set of motifs which are acquired by acquiring unit 1202, it can be determined whether or not there is a high degree of correspondence between the motifs of the set of motifs and the motifs detected in the second data. If a high degree of correspondence exists, then it is likely that the second data relates to the activity of interest (e.g. money laundering).

As such, in some examples, the identification unit 1206 may be configured to compare the set of motifs with the detected motifs of the second data by identifying a number of instances of individual motifs of the set of motifs within the detected motifs of the second data.

More specifically, the identifying unit 1206 may compute the intersection between the set of motifs and the motifs which have been detected in the second data (i.e. a group $M_1 \cap D$, where $M_1$ is the motifs of the set of motifs and D is the motifs detected in the second data).

If the number of motifs in the intersection between the set of motifs and the motifs of the second data is high (e.g. above a predetermined threshold value) then it can be determined that the second data relates to the activity and/or messages of interest (e.g. money laundering).

In some examples, the predetermined threshold value may be set as a percentage of the motifs of the set of motifs. That is, in some examples if a certain percentage of the motifs of the set of motifs are found in the second data then it can be determined that the second data relates to the messages of interest.

In some examples, the identifying unit 1206 may perform a weighting based also on the frequency of appearance of the motifs of the set of motifs within the motifs of the second data. That is, is a motif (such as motif 6000) is found with high frequency within the second data then it is more likely that the second data contains or relates to the messages of interest (e.g. money laundering).

In some examples, the identifying unit 1206 may further perform a weighing based also on a value of significance associated with the motifs of the set of motifs. That is, when a motif with high significance (such as motif 6000) is found within the second data then it is more likely that the second data relates to the messages of interest.

If the second data is large-such as when the second data includes a set of messages from across a large portion of the network (such as that illustrated with reference to FIG. 4 of the present disclosure)—then the identifying unit 1206 may further identify a portion or portions of the second data with a high concentration of motifs from the set of motifs. The portions of the second data with high concentration of motifs from the set of motifs can then be identified as portions of the second data which relate to the messages or activity of interest. In this manner, the identifying unit 1206 can identify messages of interest within the second data for sub-sections or sub-portions of the second data.

Of course, the methods of comparing the set of motifs with the motifs detected in the second data are not particularly limited to these specific examples. More generally, the identifying unit may identify messages of interest within the second data in any manner suitable provided that a comparison is made between the set of motifs acquired by acquiring unit 1202 (e.g. those constructed by constructing unit 5008 of the apparatus 5000 of the present disclosure). In this regard, use of the set of motifs in order to detect messages of interest within the second data enables reliable and efficient detection of the set of messages within second data.

Once the messages of interest have been detected, the identifying unit 1206 may further be configured in order to produce a notification or alert message (or any other type of warning, such as a flag or the like) in order to indicate that messages of interest have been detected in the second set of messages. At this stage, further investigations into the messages which have been detected within the second data can be performed. In the specific example of a banking network (such as that described with reference of FIG. 2 of the present disclosure, for example) this enables illicit and/or fraudulent activity in a set of transactions exchanged between accounts within the network to be rapidly identified. Then, once the identifying unit 1206 has identified that the second data includes messages of interest, those messages can be further investigated by a group of investigators. This enables the fraudulent activity to be disrupted more effectively. In some examples, a further action (such as shutting an account identified as engaging in fraudulent activity) can be taken by apparatus 1200 as soon as the messages of interest have been identified.

In some examples, the second data may be received when a set of messages which have been exchanged in a network of nodes are obtained. However, in other examples, the second data may be continuously acquired (as a stream of messages are exchanged between the nodes in the network). In this case, the apparatus 1200 may identify messages of interest within the second data as the stream of messages between nodes in the network occurs. This is advantageous as it enables messages of interest to be identified within the network very quickly.

In this manner, the identifying unit 1206 is configured to identify messages of interest by comparing the set of motifs with the detected motifs within the second data.

<Advantageous Technical Effects>

According to embodiments of the disclosure, a set of motifs (or patterns of messages or transactions) can be used in order to identify certain activity of interest in a network with increased speed and computational efficiency. In a banking network, for example, this enables fraudulent activity to be rapidly and efficiently identified. Accordingly, the fraudulent activity can be disrupted more effectively.

<Method>

Figure 13:
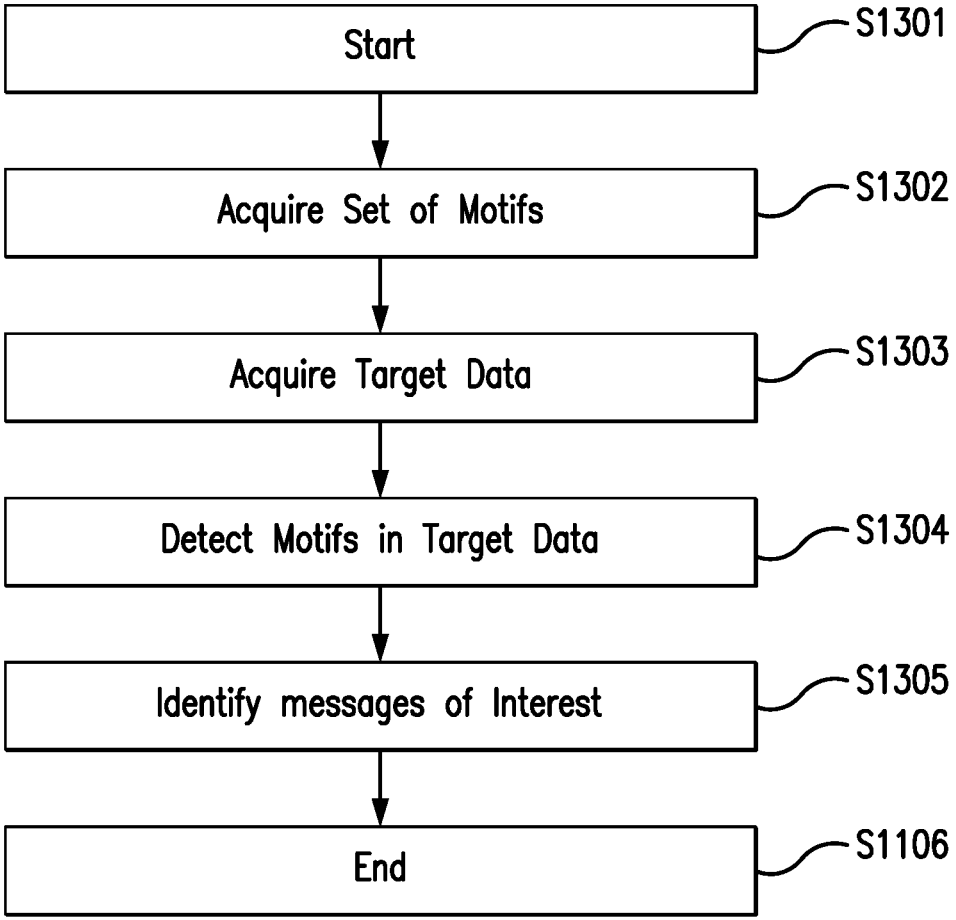
FIG. 13 illustrates a method in accordance with embodiments of the disclosure.

Hence, more generally, a method of using a set of motifs in detection of messages of interest in a network of nodes is provided in accordance with embodiments of the disclosure. FIG. 13 illustrates a method in accordance with embodiments of the disclosure.

The method starts with method step S1301 and proceeds to step S1302.

In step S1302, the method comprises controlling circuitry to acquire a set of motifs for use in detecting messages of interest in the network of nodes. The set of motifs may have been constructed in accordance with a method such as that illustrated in FIG. 11 of the present disclosure, for example.

Then, in step S1303, the method comprises controlling circuitry to acquire second data, the second data comprising a set of messages which have been exchanged between nodes in the network.

Once the second data has been received, the method proceeds to step S1304.

In step S1304, the method comprises detecting motifs within the second data, each motif being a repeated pattern of messages appearing within the second data.

In method step S1305, the circuitry is then controlled in order to identify messages of interest by comparing the set of motifs with the detected motifs within the second data.

The method then proceeds to and ends with method step S1306.

Of course, it will be appreciated that the method of the present disclosure is not particularly limited to the example method steps, or order of these method steps, illustrated in FIG. 13 of the present disclosure. In particular, it will be understood that in some examples it may be advantageous if a number of the method steps are performed in a different order to that illustrated in FIG. 13 of the present disclosure. In particular, a number of these method steps may in fact be performed in parallel. For example, the step of acquiring the set of motifs and acquiring the second data may, optionally, be performed in parallel.

Likewise, the step of detecting the motifs within the second data may be performed in parallel with the step of acquiring the second data (i.e. as the second data is being received). Nevertheless, FIG. 13 illustrates one example of a method of constructing a set of motifs for use in detecting messages of interest in a network of nodes in accordance with embodiments of the disclosure.

In addition, embodiments of the present disclosure may be arranged in accordance with the following numbered clauses:

1. Method of constructing a set of motifs for use in detecting messages of interest in a network of nodes, the method comprising controlling circuitry to:

acquire target data, the target data comprising a set of messages which have been exchanged between nodes in the network, the set of messages including a number of messages of interest;

acquire control data, the control data comprising a set of messages which have been produced based on a random exchange of messages between nodes in the network;

detect motifs within the target data and the control data, each motif being a repeated pattern of messages appearing within either the target data and/or the control data;

generate a set of values indicative of a significance of the motifs which have been detected in the target data and the motifs which have been detected in the control data using a frequency with which these motifs have been detected; and construct a set of motifs for use in detecting messages of interest in the network using the set of values which have been produced and a comparison of the motifs detected in the target data with the motifs detected in the control data.

2. The method of clause 1, wherein the set of messages of the target data and the set of messages of the control data each comprise a connected graph of messages between nodes indicative of a flow of messages between nodes in the network.

3. The method according to clause 2, wherein the nodes are bank accounts in a banking network and the flow of messages between bank accounts in the banking network is indicative of a dispersion of funds through the network.

4. The method according to clause 2, wherein the method further comprises controlling the circuitry to generate at least one Erdos-Reyni graph as the set of messages of the control data.

5. The method according to clause 2, wherein the motifs are individual subgraphs within each set of messages and wherein the method further comprises controlling the circuitry to detect the motifs within the target data and/or the control data by sampling random subgraphs within the set of messages.

6. The method according to clause 2, wherein the motifs are individual subgraphs within each set of messages and wherein the method further comprises controlling the circuitry to detect the motifs within the target data and/or the control data by enumerating all subgraphs of a predetermined size within the set of messages.

7. The method of clause 2, wherein the value indicative of the significance of a motif, $z_i$, is calculated using the equation:

$$z_i = \frac{N_i - \langle N_i^s \rangle}{\sqrt{\langle (N_i^s)^2 \rangle - \langle N_i^s \rangle^2}}$$

where $N_i$ is the frequency with which motif i is present in a set of messages, Ns is the frequency motif i is present in a random shuffle of the set of messages.

8. The method according to clause 7, wherein the method comprises controlling the circuitry to generate the random shuffle of the set of messages using a random rewiring of the set of messages that preservers a degree sequence of the set of messages.

9. The method according to any preceding clause, wherein the set of motifs which are constructed comprise motifs present in only the target data and where the motifs have a significance value above a first predetermined threshold and a frequency above a second predetermined threshold.

10. The method according to any preceding clause, wherein the set of motifs which are constructed comprise motifs present in both the target data and the control data and where the motifs have a significance value for the target data above a third predetermined threshold and a significance value for the control data below a fourth predetermined threshold.

11. Method of using a set of motifs in detection of messages of interest in a network of nodes, the method comprising controlling circuitry to:

acquire a set of motifs for use in detecting messages of interest in the network of nodes, the set of motifs being constructed in accordance with any of clauses 1 to 10;

acquire second data, the second data comprising a set of messages which have been exchanged between nodes in the network;

detect motifs within the second data, each motif being a repeated pattern of messages appearing within the second data; and identify messages of interest by comparing the set of motifs with the detected motifs within the second data.

12. The method according to clause 11, wherein comparing the set of motifs with the detected motifs includes identifying a number of instances of individual motifs of the set of motifs within the motifs of the second data.

13. Apparatus for constructing a set of motifs for use in detecting messages of interest in a network of nodes, the apparatus comprising circuitry configured to:

acquire target data, the target data comprising a set of messages which have been exchanged between nodes in the network, the set of messages including a number of messages of interest;

acquire control data, the control data comprising a set of messages which have been produced based on a random exchange of messages between nodes in the network;

detect motifs within the target data and the control data, each motif being a repeated pattern of messages appearing within either the target data and/or the control data;

generate a set of values indicative of a significance of the motifs which have been detected in the target data and the motifs which have been detected in the control data using a frequency with which these motifs have been detected; and construct a set of motifs for use in detecting messages of interest in the network using the set of values which have been produced and a comparison of the motifs detected in the target data with the motifs detected in the control data.

14. Apparatus for using a set of motifs in detection of messages of interest in a network of nodes, the apparatus comprising circuitry configured to:

acquire a set of motifs for use in detecting messages of interest in the network of nodes, the set of motifs being constructed in accordance with any of clauses 1 to 10;

acquire second data, the second data comprising a set of messages which have been exchanged between nodes in the network;

detect motifs within the second data, each motif being a repeated pattern of messages appearing within the second data; and identify messages of interest by comparing the set of motifs with the detected motifs within the second data.

15. Computer program product comprising instructions which, when implemented by a computer, cause the computer to perform the method of clause 1 or clause 11.

Of course, while certain embodiments of the disclosure have been described with reference to the situation of detection of money laundering activity in the example of a banking network, it will be appreciated that the present disclosure is not particularly limited in this regard. That is, embodiments of the disclosure can be used, more generally, to construct a set of motifs for detection of messages of interest in a network. The messages of interest are not messages which need be limited solely to money laundering activity but can include any other type of messages depending on the situation. In order to detect messages of interest it is merely required that said messages of interest are included in the target data which is used for construction of the set of motifs.

Accordingly, said embodiments of the disclosure can be used in order to detect messages of interest in many other types of networks including communication networks (such as telephone networks) and the like.

Furthermore, while numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. A method of constructing a set of motifs for use in detecting messages of interest in a network of nodes, the method comprising controlling circuitry to:

acquire target data, the target data comprising a set of messages which have been exchanged between nodes in the network, the set of messages including messages of interest:

acquire control data, the control data comprising a set of messages by simulating random exchanges of messages between nodes in the network, such that the control data represents message patterns expected to occur by chance;

detect a first plurality of motifs within the target data, each of the first plurality of motifs being a repeated pattern of messages appearing within the target data;

detect a second plurality of motifs within the control data, each of the second plurality of motifs being a repeated pattern of messages appearing within the control data;

for each of the motifs which have been detected in the target data and each of the motifs which have been detected in the control data, generate a value indicative of a significance of the motif, wherein the value is based on the following:

a frequency of a motif appearing in the target data, and an average frequency of the motif appearing in the control data; and identify one or more motifs that have a value above a predefined threshold as a motif that represents a message of interest for use in detecting messages of interest from transaction data in the network.

2. The method of claim 1, wherein the set of messages of the target data and the set of messages of the control data each comprise a connected graph of messages between nodes indicative of a flow of messages between nodes in the network.

3. The method according to claim 2, wherein the nodes are bank accounts in a banking network and the flow of messages between bank accounts in the banking network is indicative of a dispersion of funds through the network.

4. The method according to claim 2, wherein the method further comprises controlling the circuitry to generate at least one Erdos-Reyni graph as the set of messages of the control data.

5. The method according to claim 2, wherein the motifs are individual subgraphs within each set of messages and wherein the method further comprises controlling the circuitry to detect the motifs within the target data and/or the control data by sampling random subgraphs within the set of messages.

6. The method according to claim 2, wherein the motifs are individual subgraphs within each set of messages and wherein the method further comprises controlling the circuitry to detect the motifs within the target data and/or the control data by enumerating all subgraphs of a predetermined size within the set of messages.

7. The method according to claim 1, wherein the set of motifs which are constructed comprise motifs present in only the target data and where the motifs have a significance value above a first predetermined threshold and a frequency above a second predetermined threshold.

8. The method according to claim 1, wherein the set of motifs which are constructed comprise motifs present in both the target data and the control data and where the motifs have a significance value for the target data above a third predetermined threshold and a significance value for the control data below a fourth predetermined threshold.

9. An apparatus for constructing a set of motifs for use in detecting messages of interest in a network of nodes, the apparatus comprising circuitry configured to:

acquire target data, the target data comprising a set of messages which have been exchanged between nodes in the network, the set of messages including messages of interest:

acquire control data, the control data comprising a set of messages which have been acquire control data, the control data comprising a set of messages by simulating random exchanges of messages between nodes in the network, such that the control data represents message patterns expected to occur by chance;

detect a first plurality of motifs within the target data, each of the first plurality of motifs being a repeated pattern of messages appearing within the target data;

detect a second plurality of motifs within the control data, each of the second plurality of motifs being a repeated pattern of messages appearing within the control data;

for each of the motifs which have been detected in the target data and each of the motifs which have been detected in the control data, generate a value indicative of a significance of the motif, wherein the value is based on the following:

a frequency of a motif appearing in the target data, and an average frequency of the motif appearing in the control data; and identify one or more motifs that have a value above a predefined threshold as a motif that represents a message of interest for use in detecting messages of interest from transaction data in the network.

10. The apparatus according to claim 9, wherein the set of messages of the target data and the set of messages of the control data each comprise a connected graph of messages between nodes indicative of a flow of messages between nodes in the network.

11. The apparatus according to claim 10, wherein the nodes are bank accounts in a banking network and the flow of messages between bank accounts in the banking network is indicative of a dispersion of funds through the network.

12. The apparatus according to claim 10, wherein the motifs are individual subgraphs within each set of messages and wherein the method further comprises controlling the circuitry to detect the motifs within the target data and/or the control data by sampling random subgraphs within the set of messages.

13. The apparatus according to claim 10, wherein the motifs are individual subgraphs within each set of messages and wherein the method further comprises controlling the circuitry to detect the motifs within the target data and the control data by enumerating all subgraphs of a predetermined size within the set of messages.

14. The apparatus according to claim 9, wherein the set of motifs which are constructed comprise motifs present in only the target data and where the motifs have a significance value above a first predetermined threshold and a frequency above a second predetermined threshold.

15. The apparatus according to claim 9, wherein the set of motifs which are constructed comprise motifs present in both the target data and the control data and where the motifs have a significance value for the target data above a third predetermined threshold and a significance value for the control data below a fourth predetermined threshold.

16. A computer-readable storage device comprising computer executable instructions, that when executed by a processor, cause the processor to perform the following operations:

acquire target data, the target data comprising a set of messages which have been exchanged between nodes in the network, the set of messages including messages of interest:

acquire control data, the control data comprising a set of messages which have been acquire control data, the control data comprising a set of messages by simulating random exchanges of messages between nodes in the network, such that the control data represents message patterns expected to occur by chance;

detect a first plurality of motifs within the target data, each of the first plurality of motifs being a repeated pattern of messages appearing within the target data;

detect a second plurality of motifs within the control data, each of the second plurality of motifs being a repeated pattern of messages appearing within the control data;

for each of the motifs which have been detected in the target data and each of the motifs which have been detected in the control data, generate a value indicative of a significance of the motif, wherein the value is based on the following:

a frequency of a motif appearing in the target data, and an average frequency of the motif appearing in the control data; and identify one or more motifs that have a value above a predefined threshold as a motif that represents a message of interest for use in detecting messages of interest from transaction data in the network.

17. The computer-readable storage device according to claim 16, wherein the set of messages of the target data and the set of messages of the control data each comprise a connected graph of messages between nodes indicative of a flow of messages between nodes in the network.

18. The apparatus according to claim 17, wherein the nodes are bank accounts in a banking network and the flow of messages between bank accounts in the banking network is indicative of a dispersion of funds through the network.

19. The apparatus according to claim 17, wherein the motifs are individual subgraphs within each set of messages and wherein the method further comprises controlling the circuitry to detect the motifs within the target data and/or the control data by sampling random subgraphs within the set of messages.

20. The apparatus according to claim 17, wherein the motifs are individual subgraphs within each set of messages and wherein the method further comprises controlling the circuitry to detect the motifs within the target data and the control data by enumerating all subgraphs of a predetermined size within the set of messages.

* * * * *